(12) United States Patent
Jones

(10) Patent No.: US 10,898,976 B2
(45) Date of Patent: Jan. 26, 2021

(54) METHOD OF MANUFACTURING A BOX HEADER FOR HEAT EXCHANGER

(71) Applicant: AXH Air-Coolers, LLC, Tulsa, OK (US)

(72) Inventor: Ken Jones, Tulsa, OK (US)

(73) Assignee: AXH AIR-COOLERS, LLC, Tulsa, OK (US)

( * ) Notice: Subject to any disclaimer, the term of this patent is extended or adjusted under 35 U.S.C. 154(b) by 184 days.

(21) Appl. No.: 16/181,094

(22) Filed: Nov. 5, 2018

(65) Prior Publication Data
US 2019/0134764 A1 May 9, 2019

Related U.S. Application Data

(60) Provisional application No. 62/582,035, filed on Nov. 6, 2017.

(51) Int. Cl.
*B23P 15/26* (2006.01)
(52) U.S. Cl.
CPC ......... *B23P 15/26* (2013.01); *Y10T 29/49389* (2015.01)
(58) Field of Classification Search
CPC ........................... B23P 15/26; Y10T 29/49389
See application file for complete search history.

(56) References Cited

U.S. PATENT DOCUMENTS

| 2,069,409 A | 2/1937 | Heenan | |
| 2,133,249 A | 10/1938 | Kerr | |
| 2,887,304 A | 5/1959 | Hilliard | |
| 3,876,149 A * | 4/1975 | Futerko | B23P 15/16 239/398 |
| 4,746,479 A * | 5/1988 | Hanaki | B28B 3/269 264/629 |
| 4,807,342 A * | 2/1989 | Lapeyre | F28F 21/087 165/165 |
| 4,896,410 A * | 1/1990 | Spitzmesser | B23P 15/26 29/527.1 |
| 5,004,047 A | 4/1991 | Meier et al. | |
| 5,115,686 A | 5/1992 | Walker et al. | |
| 5,373,634 A * | 12/1994 | Lipp | B23P 15/26 165/185 |

(Continued)

FOREIGN PATENT DOCUMENTS

| CN | 102773675 B | 9/2014 |
| JP | 4603707 | 12/2010 |

(Continued)

*Primary Examiner* — Jason L Vaughan
(74) *Attorney, Agent, or Firm* — Head, Johnson, Kachigian & Wilkinson, PC

(57) ABSTRACT

A method of manufacturing a box header for an air-cooled heat exchanger. The method includes the steps of boring at least one hole into at least one end of an elongated slab of metal. Material from the slab is milled out adjacent to the at least one hole to form an elongated internal chamber in the slab having at least one open end. An inlet nozzle opening is machined into the elongated chamber and an outlet nozzle opening is machined into the elongated chamber. A plurality of tube holes and a plurality of plug holes are drilled and tapped in the elongated slab into the internal chamber. An end block is welded to the at least one open end in order to form a closed internal chamber.

9 Claims, 36 Drawing Sheets

(56) References Cited

U.S. PATENT DOCUMENTS

| | | | | |
|---|---|---|---|---|
| 5,787,573 | A * | 8/1998 | Pytel | F25B 43/006 |
| | | | | 29/890.06 |
| 6,155,339 | A | 12/2000 | Grapengater | |
| 6,317,975 | B1 * | 11/2001 | Asada | B21C 37/29 |
| | | | | 29/888.01 |
| 6,523,260 | B2 * | 2/2003 | Kelsey | F28F 9/02 |
| | | | | 29/890.03 |
| 6,675,882 | B1 | 1/2004 | Luberda | |
| 7,018,199 | B2 * | 3/2006 | Tooman | B23P 15/007 |
| | | | | 425/572 |
| 7,096,583 | B2 * | 8/2006 | Steed | B23P 13/02 |
| | | | | 123/184.21 |
| 7,726,025 | B2 * | 6/2010 | Lee | F28F 9/187 |
| | | | | 165/173 |
| 7,850,847 | B2 * | 12/2010 | Brown | B01D 61/08 |
| | | | | 210/321.8 |
| 2003/0006029 | A1 | 1/2003 | Kelsey | |
| 2011/0290464 | A1 * | 12/2011 | Mabes | B23P 15/26 |
| | | | | 165/173 |
| 2012/0211158 | A1 | 8/2012 | Becnet et al. | |
| 2014/0262181 | A1 | 9/2014 | Taras et al. | |
| 2014/0334992 | A1 | 11/2014 | Hazeltine | |
| 2017/0157723 | A1 * | 6/2017 | Moro-le-Gall | F28D 9/0093 |

FOREIGN PATENT DOCUMENTS

| | | |
|---|---|---|
| KR | 101347191 | 1/2014 |
| KR | 1020140123319 | 10/2014 |

* cited by examiner

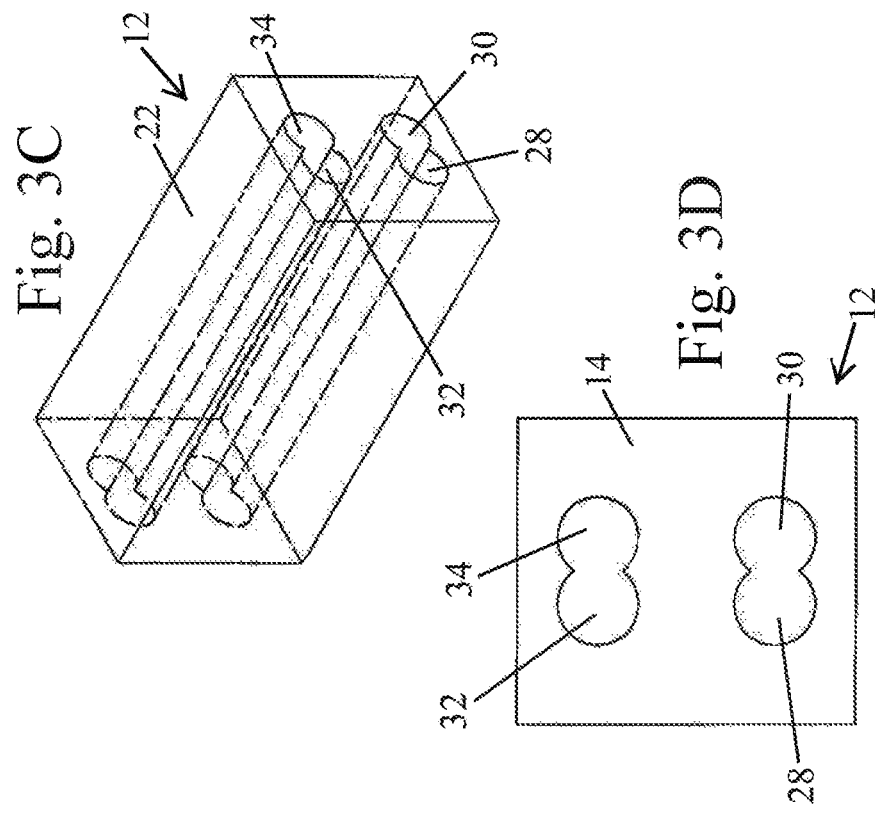
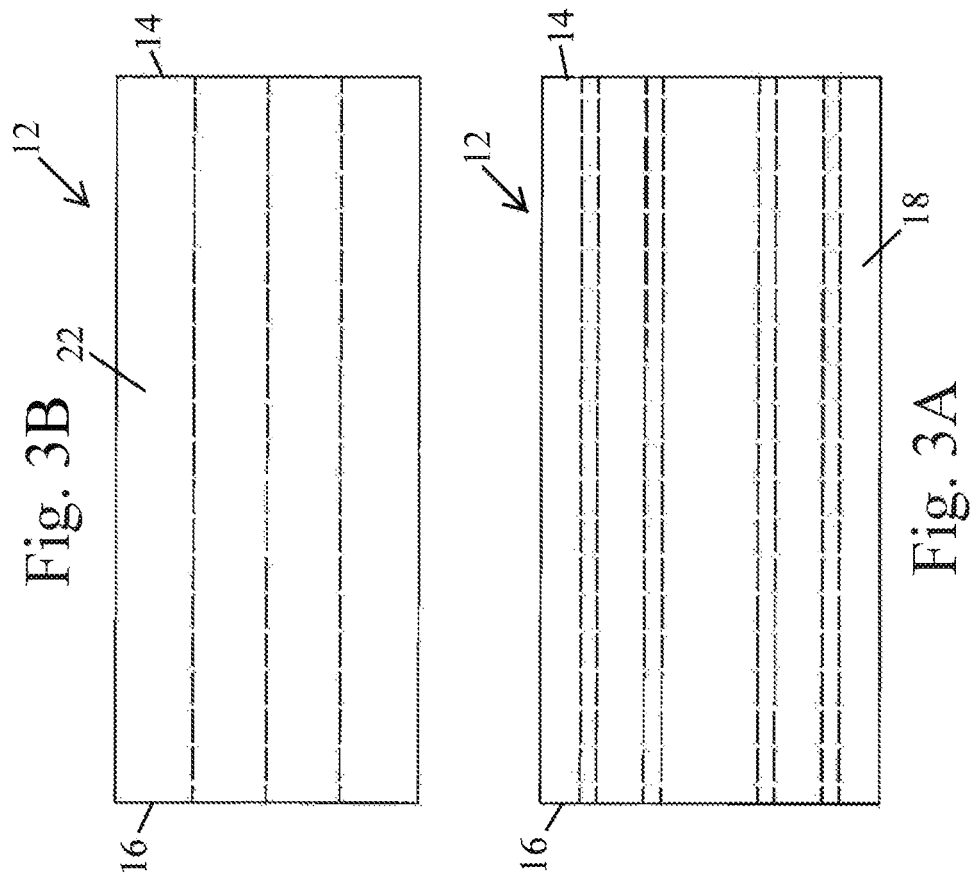

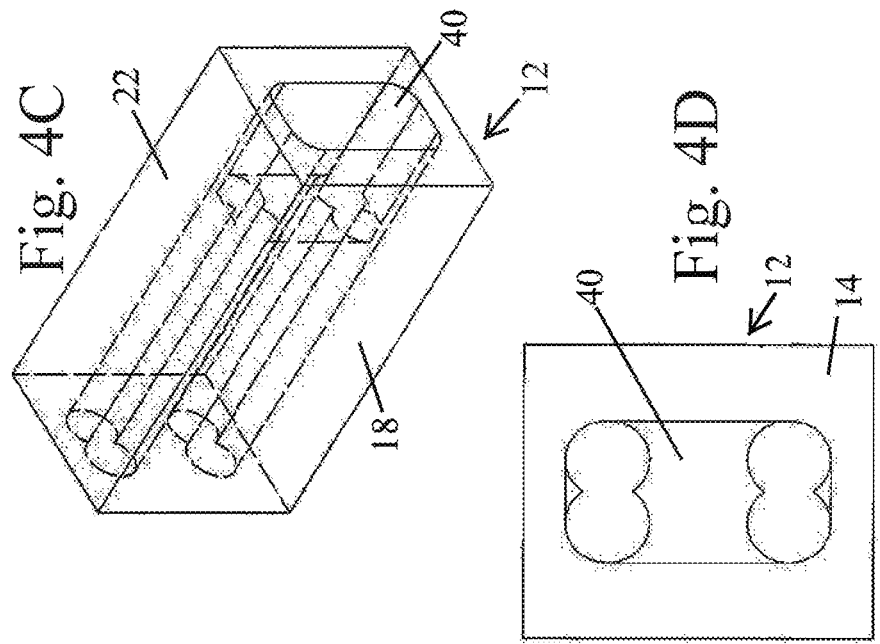
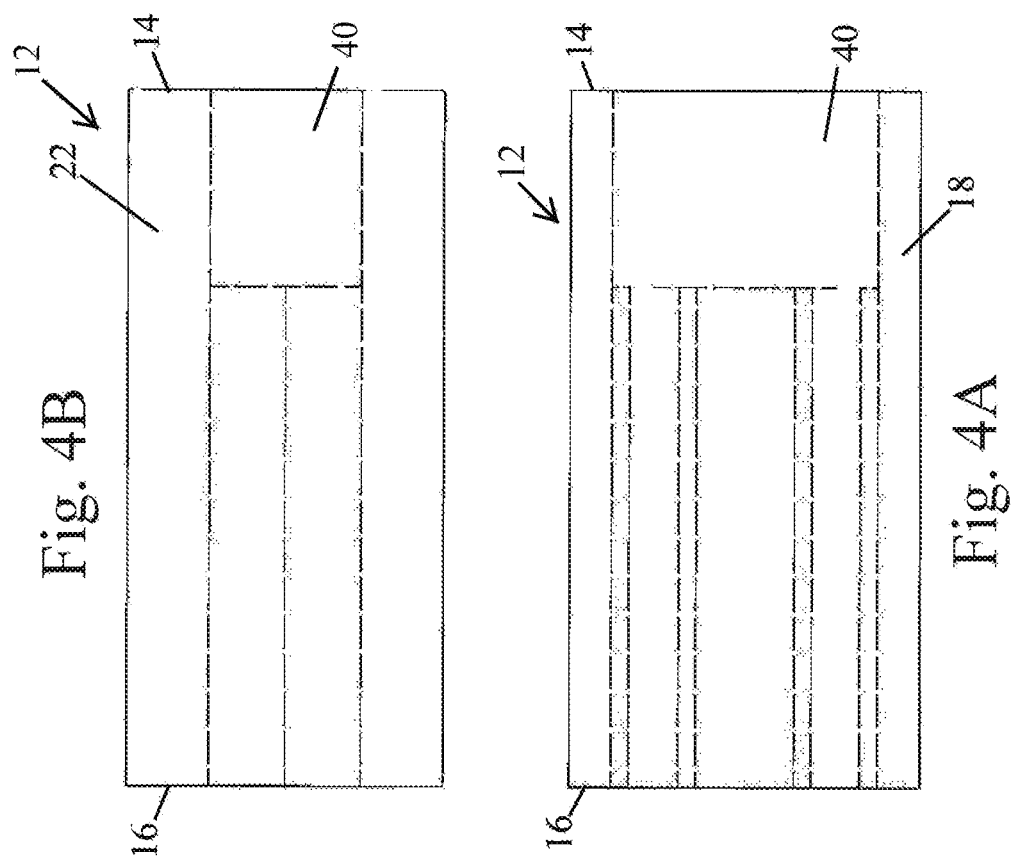

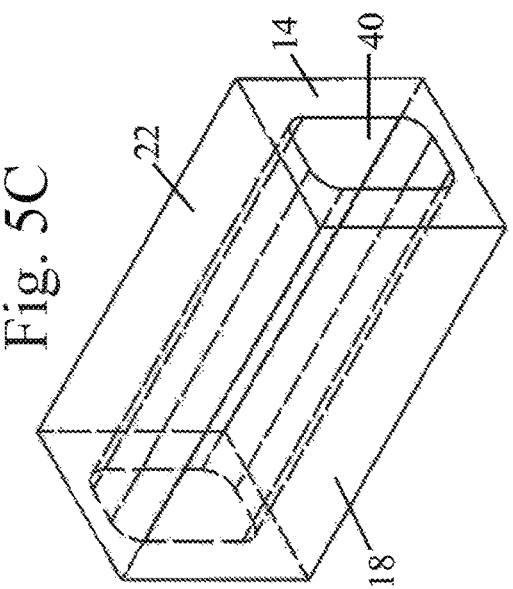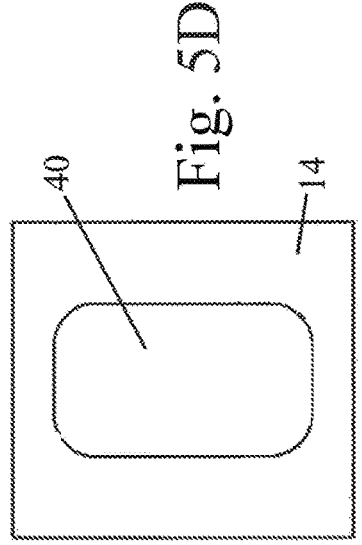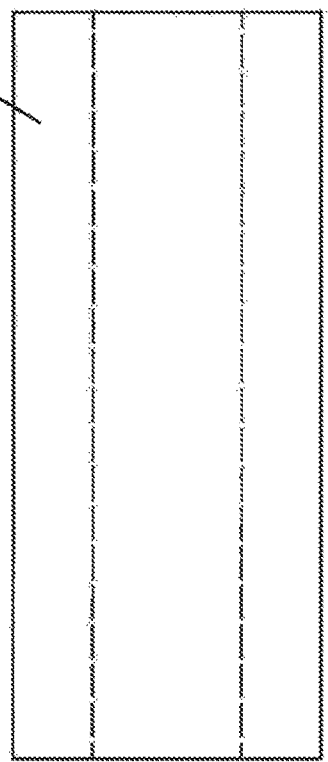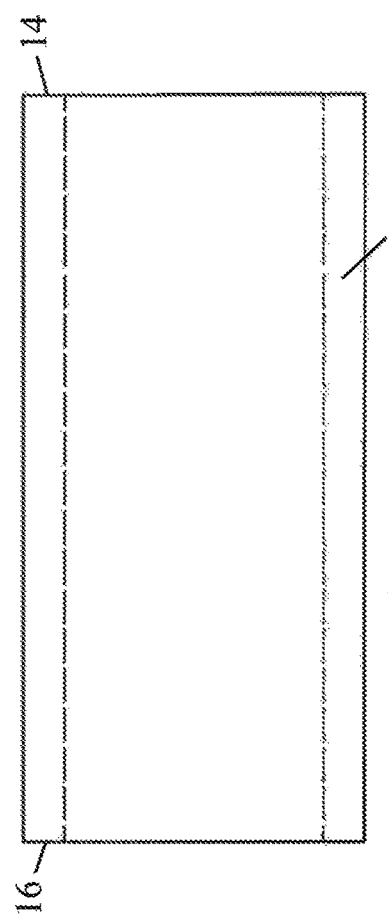

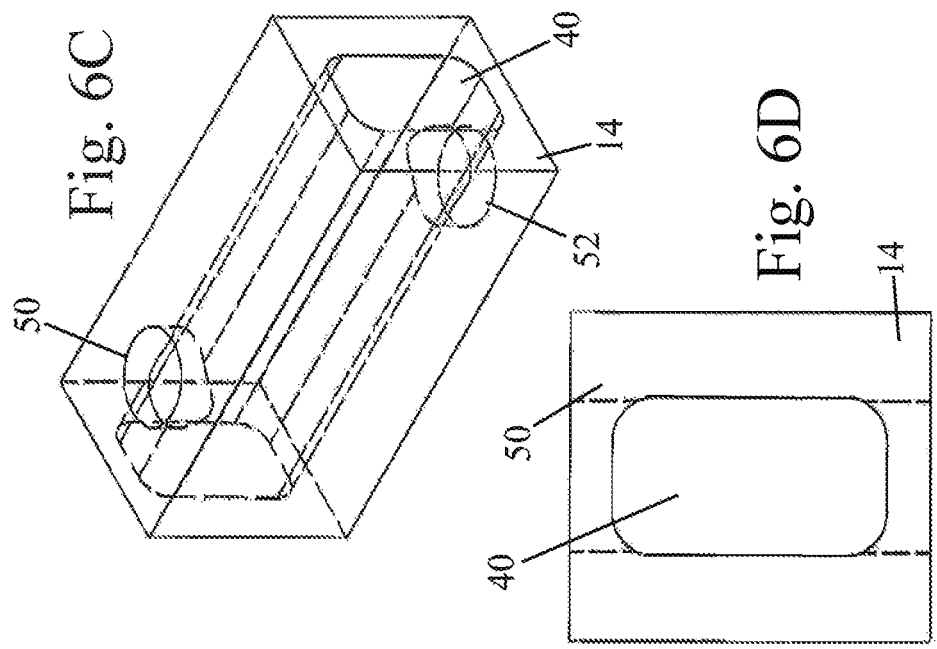
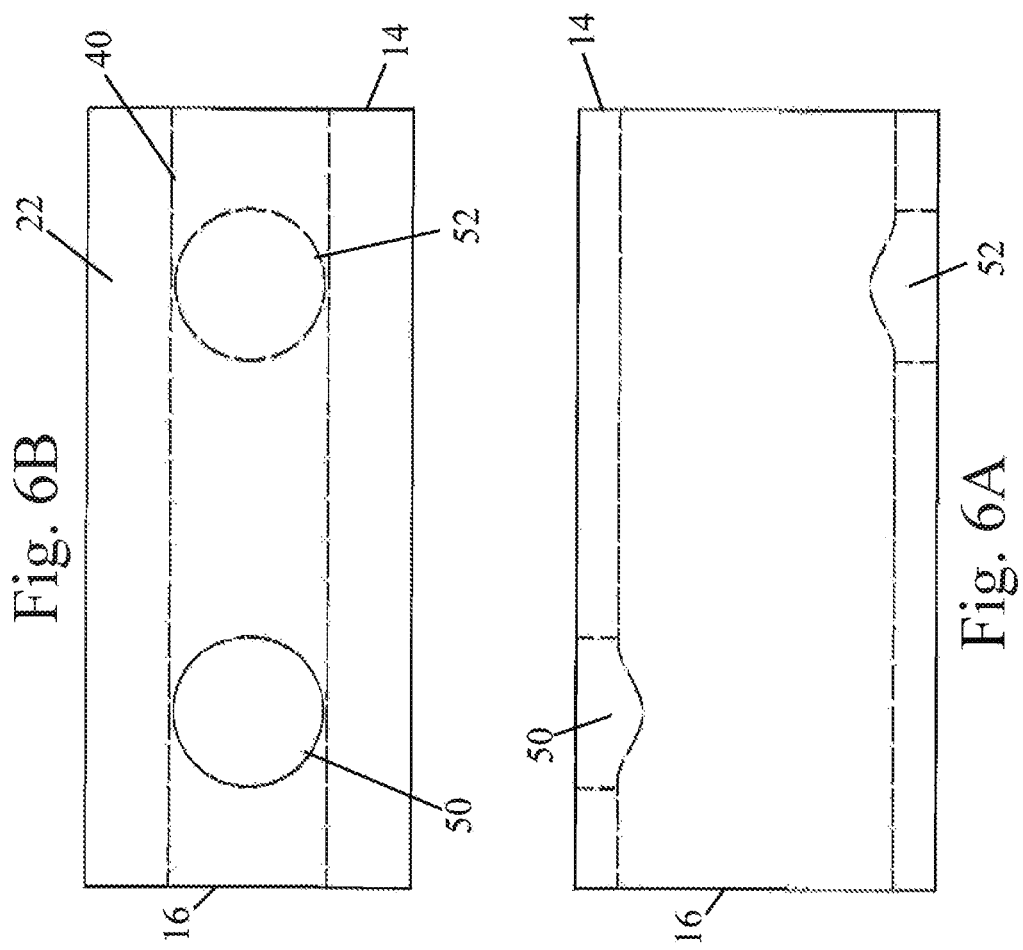

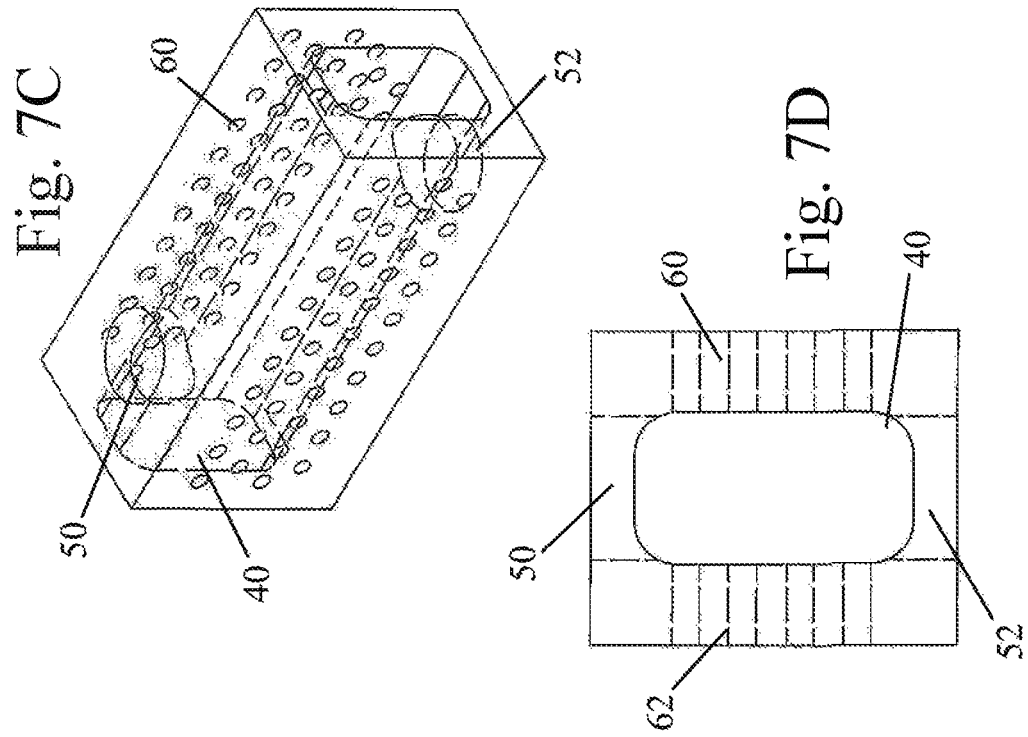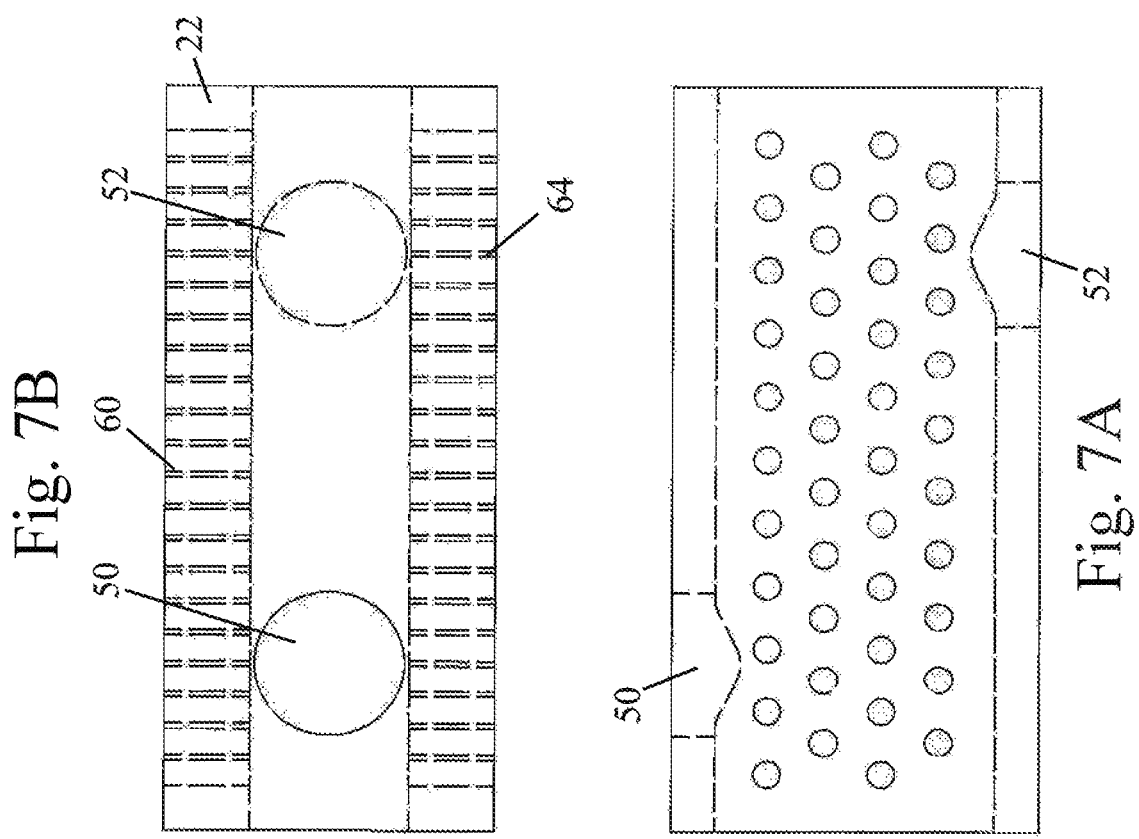

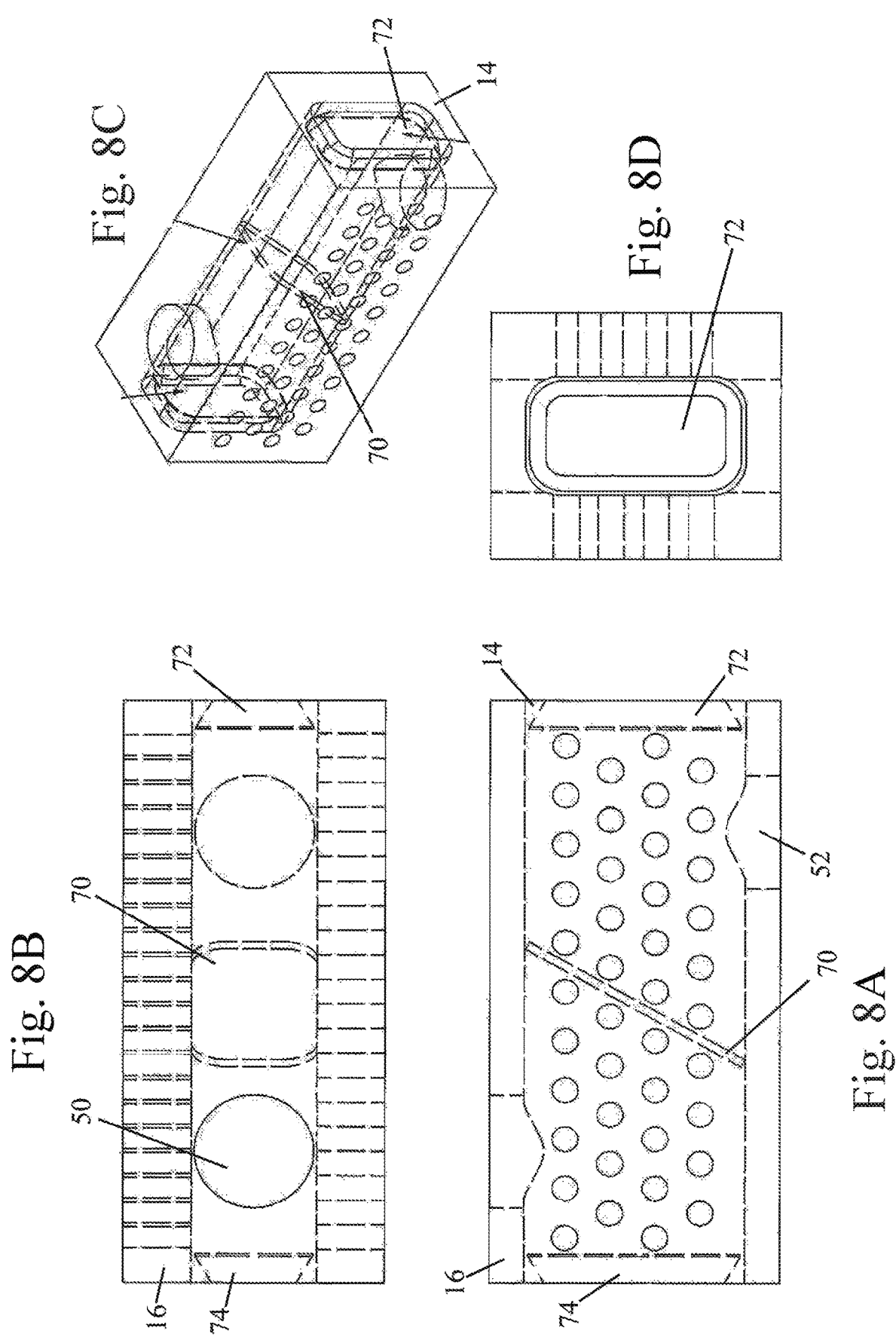

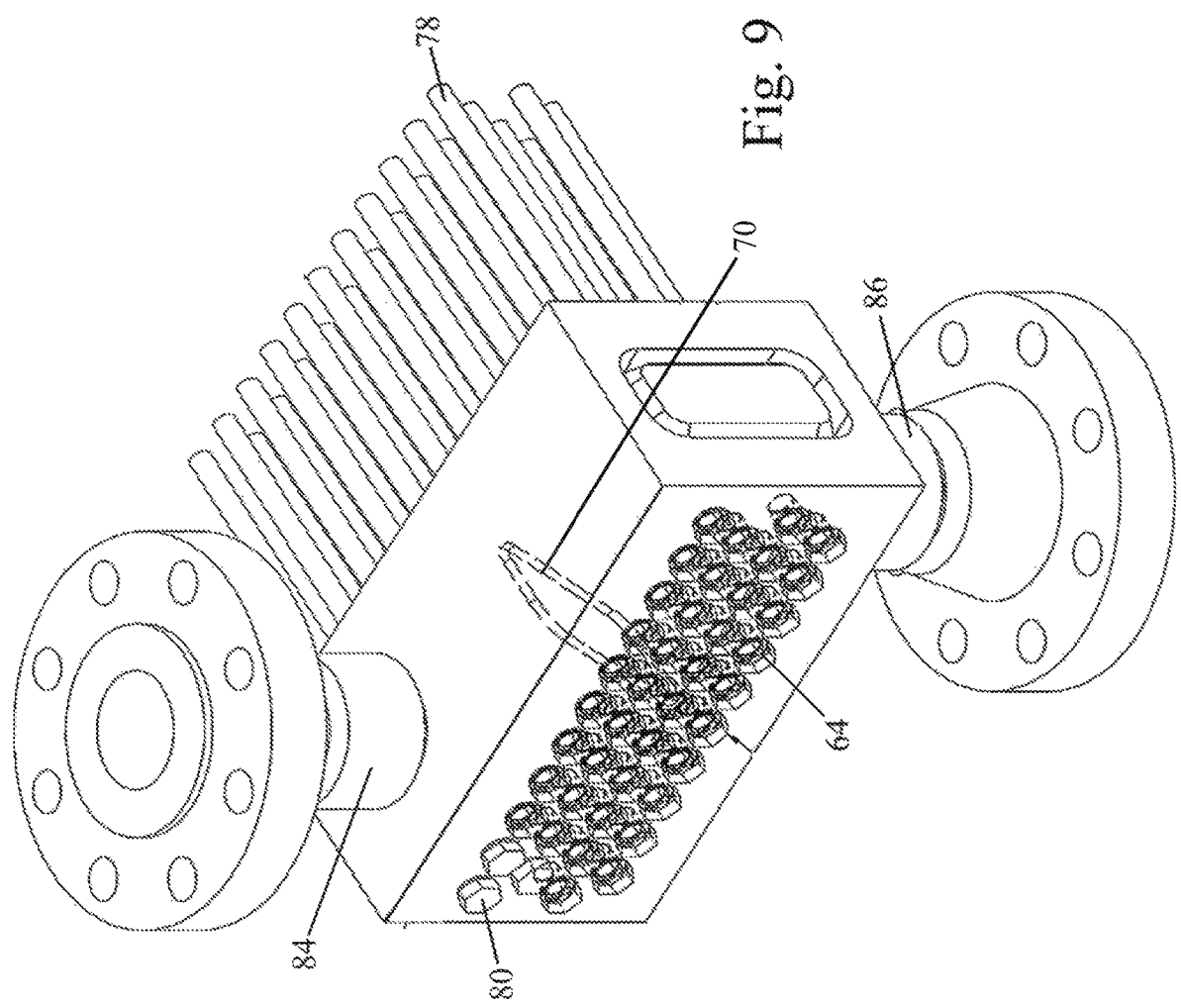

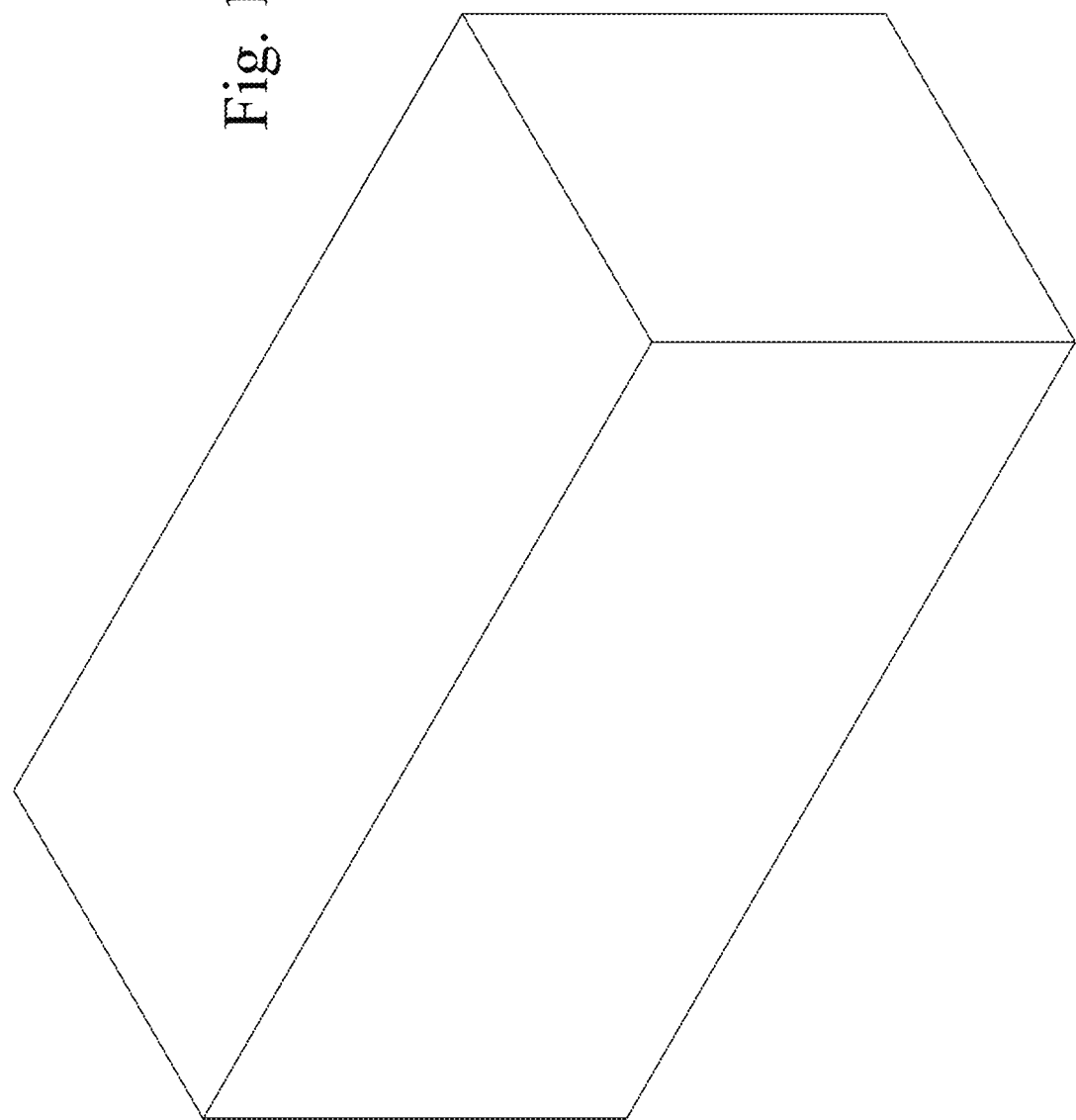

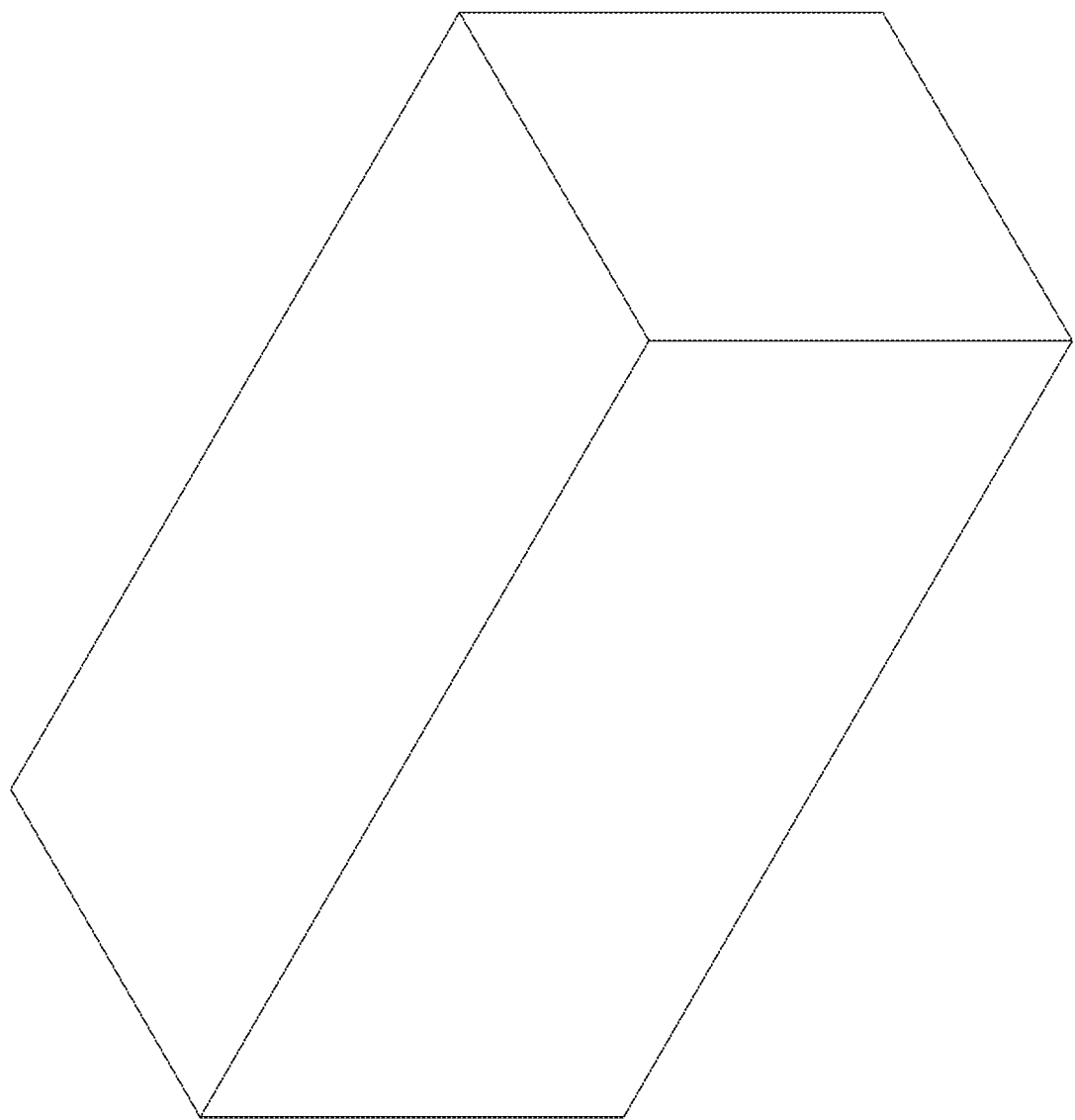

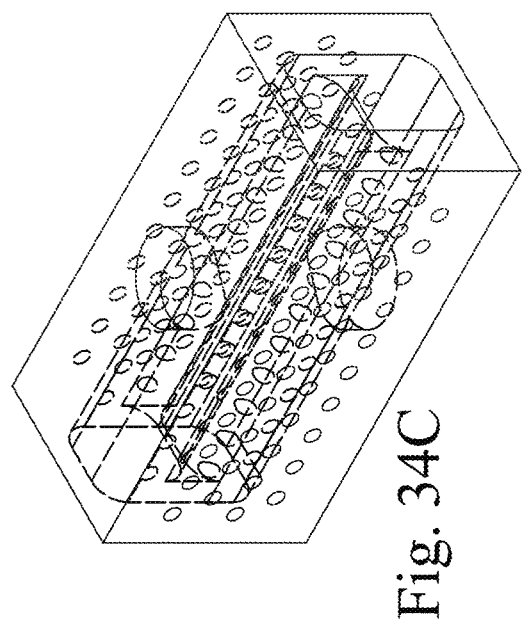
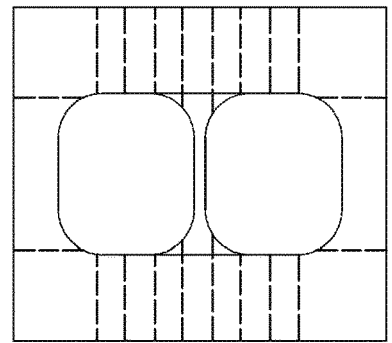
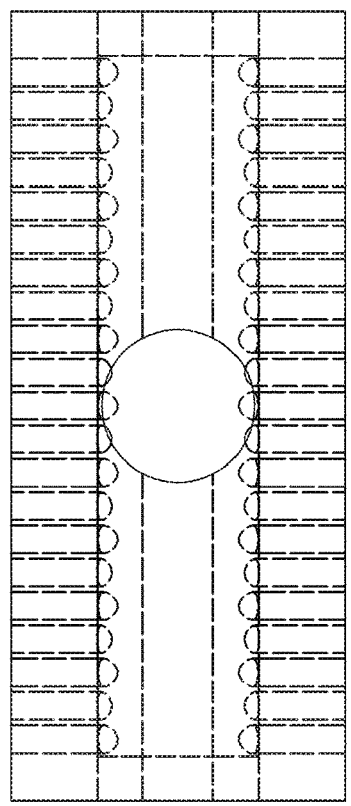
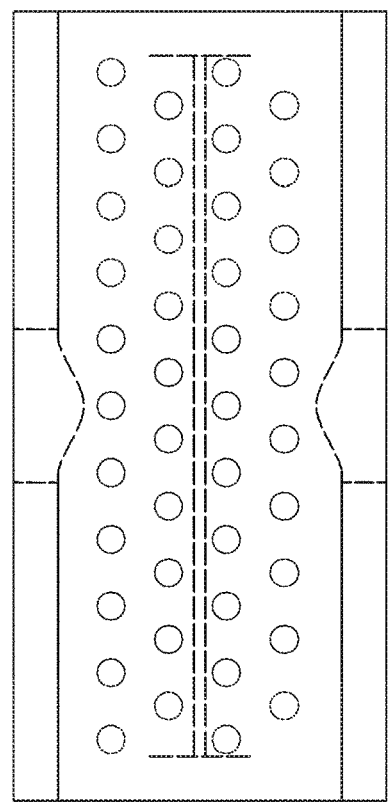
Fig. 34C
Fig. 34D
Fig. 34B
Fig. 34A

METHOD OF MANUFACTURING A BOX HEADER FOR HEAT EXCHANGER

CROSS-REFERENCE

This application is based on and claims priority to U.S. Provisional Patent Application Ser. No. 62/582,035, filed Nov. 6, 2017, which is incorporated herein in its entirety by reference.

BACKGROUND OF THE INVENTION

Field of the Invention

The present invention relates to a method or process to manufacture or fabricate a box header for an air-cooled heat exchanger. In particular, the present invention is directed to a box header for an air-cooled heat exchanger which is manufactured by a method or process superior to existing manufacturing and welding methods which decreases cycle time and reduces manufacturing costs.

Description of the Related Art

Air-cooled heat exchangers are used in a wide variety of applications. A gas or liquid fluid flows through a series of cooling tubes while atmospheric air is forced over and around the exterior of the tubes. The temperature of the fluid within the tubes is lowered as the air absorbs heat from the tubes. The tubes may be smooth surfaced but normally have extending axial fins attached to them to aid in heat transfer.

Heat exchangers may be arranged with one or more sections, also commonly known as tube bundles, arranged in rows. Typically, these sections include a pair of opposed header boxes in which the cooling tubes extend between the header boxes. The header boxes are each built or formed to create a hollow chamber for distribution of the fluids. Each internal header box chamber has multiple tube holes which allow the fluid to flow into and through the cooling tubes and pass through to the opposite header box. Each header box typically has at least one inlet pipe and flange, as well as at least one outlet pipe and flange. In addition, each header box may include one or more internal pass plates which may be positioned between groups of cooling tubes so that fluid entering an inlet header is forced to flow through various sets of tubes in a designated pattern.

The header box, thus, acts as a high-pressure manifold to distribute fluid.

A typical industry header box is fabricated or formed by welding six individual flat metal plates together. These six plates are often termed a tube sheet, a plug sheet, two wrapper plates, and two end blocks. Each of the seams joining the plates is welded. These long seams and corner seam welds result in significant fabrication time and significant expense.

To ensure the quality of each weld, these welds are often spot or completely (100%) x-rayed or ultrasonically tested in an inspection process to ensure quality and safety. This inspection process may be performed by an authorized outside third party for verification. The quality assurance process involves added time and added cost in the manufacturing process.

The header boxes are pressure vessels and must be manufactured to various standards, including American Society of Mechanical Engineers (ASME) code standards. Because stress concentrations contribute to potential weld failure in a header, it is desirable to reduce the number of welds.

A number of proposals in the past have been made for production of headers. Heenan (U.S. Pat. No. 2,069,409) discloses a heat transfer apparatus with headers f made by machining solid blocks. The blocks may be drilled through each end with a hole 1 of suitable size and depth to leave a wall 11 between the two holes in order to form two compartments. The diameter of the chamber or plenum is simply the diameter of the drill.

Kelsey (U.S. Pat. No. 6,523,260) discloses an air-cooled heat exchanger with a header box 20 having a hollow unitary body 22 and end plates 42 and 44 are welded thereto. The header assembly is constructed from a seamless quadrilateral pipe.

Notwithstanding the foregoing, it would be desirable to provide a method or process of manufacturing a box header for a heat exchanger which greatly reduces, if not eliminates, the expensive and time consuming long seam welding process.

It would likewise be desirable to provide a method or process of manufacturing a box header for a heat exchanger which significantly reduces potential weld joint stress.

It would also be very beneficial to provide a process or method of manufacturing a box header for heat exchanger which reduces the cycle time in the production of the box header and eliminates most, if not all, of the inspection time and costs associated with welding inspections.

SUMMARY OF THE INVENTION

The present invention is directed to a method or process of manufacturing or fabricating a box header for an air-cooled heat exchanger. The method or process comprises the steps of boring at least one initial hole into at least one end of an elongated solid slab of metal. In a preferred embodiment, as many as four parallel holes are bored into an end of the elongated metal slab in what will become the four corners of an elongated internal chamber. Material from the slab adjacent to the holes is then milled out in order to form an elongated open internal chamber in the slab having at least one open end.

An inlet nozzle opening is then machined into the elongated internal chamber. In addition, an outlet nozzle opening is machined in the slab into the elongated internal chamber. At least one inlet nozzle and flange may be welded to the inlet nozzle opening and at least one outlet nozzle and flange may be welded to the outlet nozzle opening.

A plurality of tube holes and a plurality of access plug holes opposite the tube holes are drilled and tapped into the elongated internal chamber. An end block is welded to each open end of the chamber in order to form a sealed closed internal chamber.

A plurality of tubes may then be inserted and installed in the corresponding tube holes. A plurality of threaded access plugs may then be installed in the access plug holes.

BRIEF DESCRIPTION OF THE DRAWINGS

FIGS. 1 through 9 illustrate a sequential, step-by-step method or process to manufacture or fabricate a box header for an air-cooled heat exchanger in accordance with one preferred embodiment of the present invention;

FIGS. 10 through 18 illustrate a sequential method or process of manufacturing or fabricating a box header utilizing drilling and milling from one end only wherein the opposed end forms a closed wall;

FIGS. 19 through 27 illustrate a further alternative method or process of manufacturing or fabricating a box header including drilling and milling from opposed ends with a center portion left in place in lieu of or instead of a pass plate in order to form two internal chambers; and FIGS. 28 through 36 illustrate a further alternate method or process of manufacturing or fabricating a box header wherein drilling or milling takes place from one end through the opposed end and wherein an elongated or horizontal portion is left in place so that the header is adapted for counterflow operation.

DETAILED DESCRIPTION OF THE INVENTION

The embodiments discussed herein are merely illustrative of specific manners in which to make and use the invention and are not to be interpreted as limiting the scope.

While the invention has been described with a certain degree of particularity, it is to be noted that many modifications may be made in the details of the invention's construction and the arrangement of its components without departing from the scope of this disclosure. It is understood that the invention is not limited to the embodiments set forth herein for purposes of exemplification.

Figure 1:
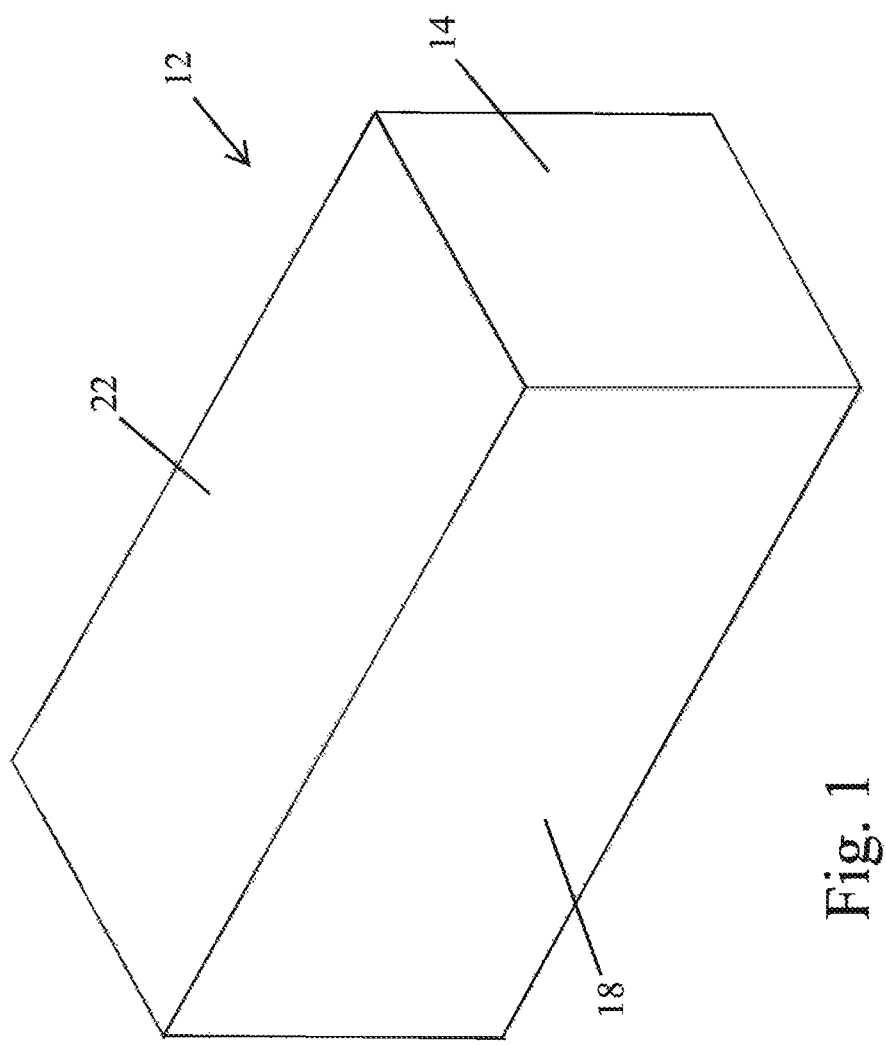

Referring to the drawings in detail, FIG. 1 illustrates a perspective view of a slab 12, block or solid plate of metal which is used in a first preferred embodiment of the method or process of manufacturing or fabricating a box header for an air-cooled heat exchanger.

The slab 12 may take a number of forms and can be substantially elongated. In one preferred embodiment, the slab 12 has a pair of opposed ends 14 and 16 which have a square or rectangular shape. Between the opposed ends 14 and 16 are two pairs of opposed sides 18, 20, 22 and 24. In one non-limiting example, the elongated slab 12 is a quadrilateral carbon steel slab. It will be appreciated that other types of metal may be employed within the scope of the invention.

Figure 2C:
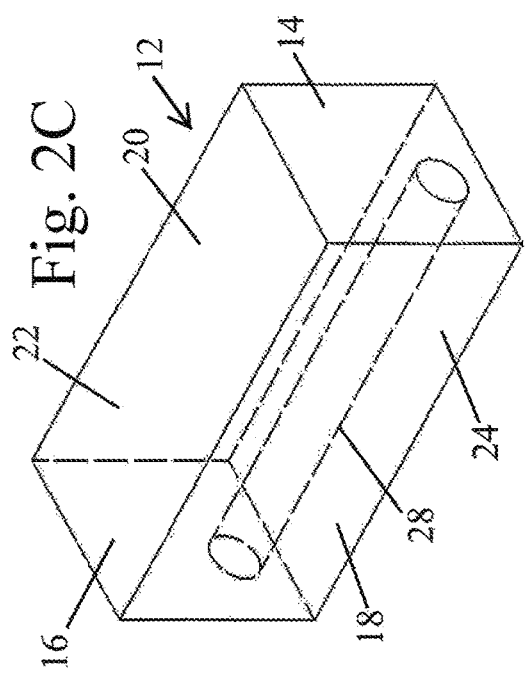
Figure 2D:
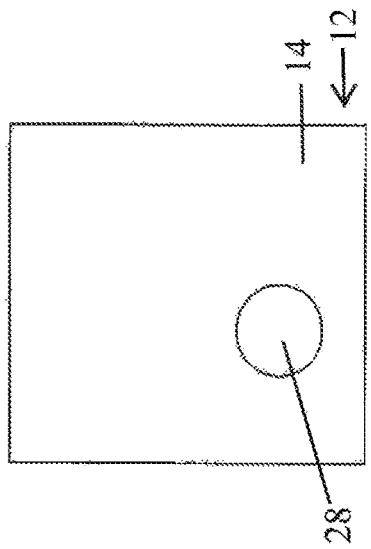
Figure 2B:
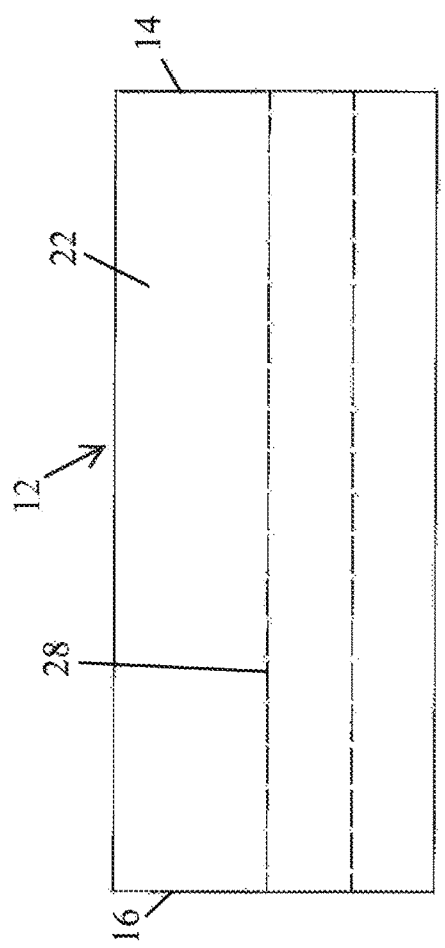
Figure 2A:
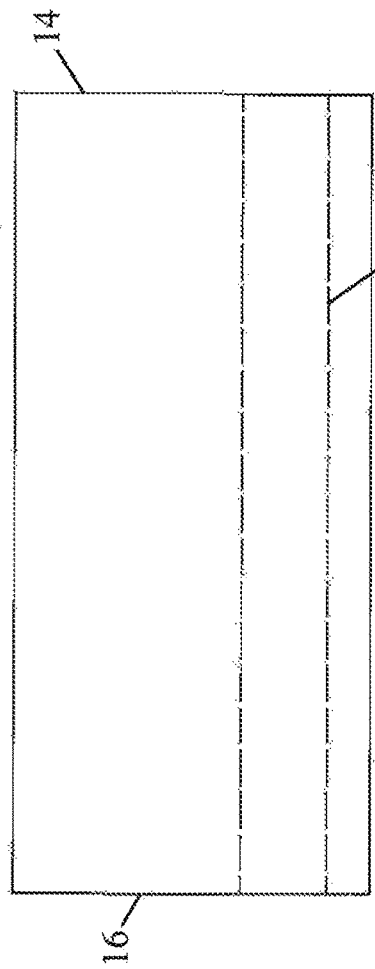
Figure 11D:
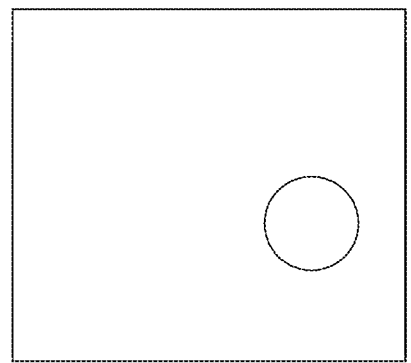
Figure 11C:
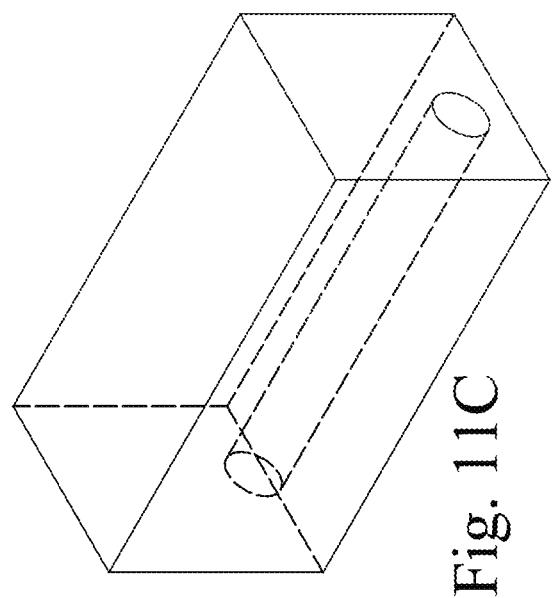
Figure 11B:
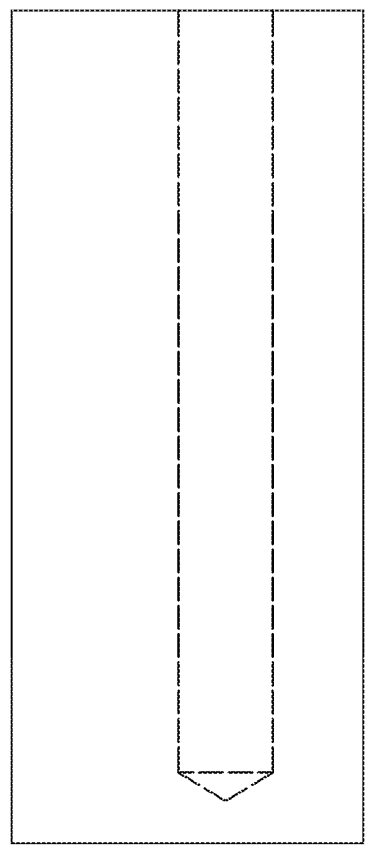
Figure 11A:
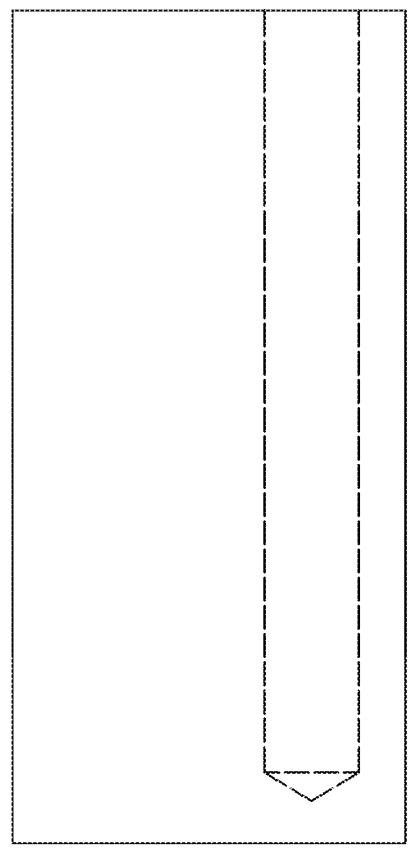
Figure 12C:
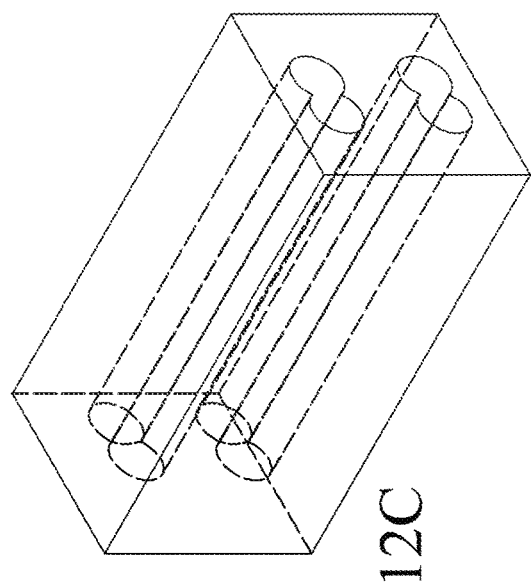
Figure 12D:
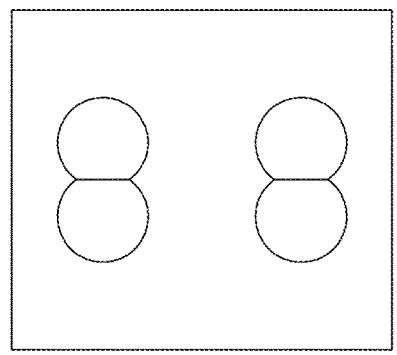
Figure 12B:
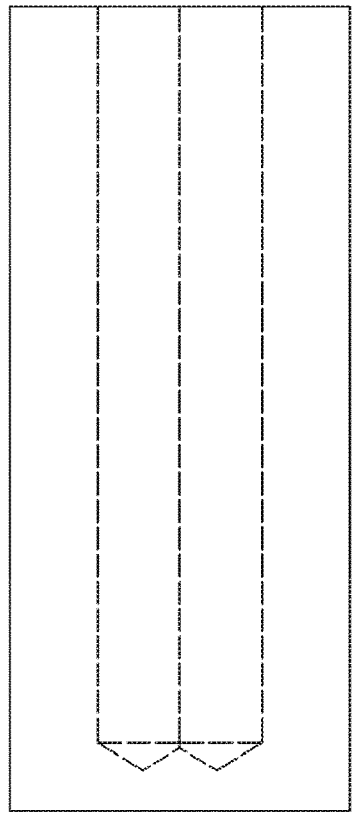
Figure 12A:
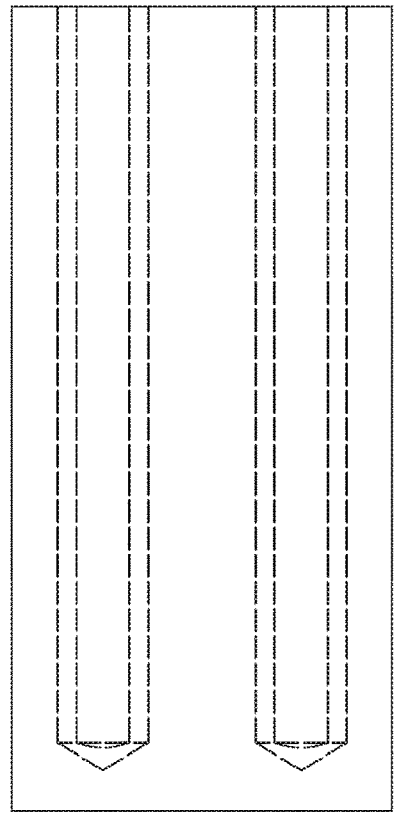
Figure 13C:
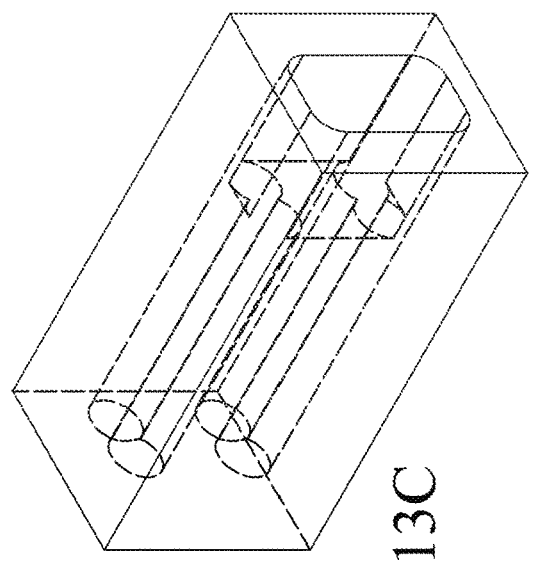
Figure 13D:
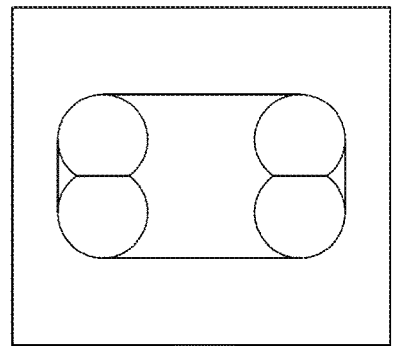
Figure 13B:
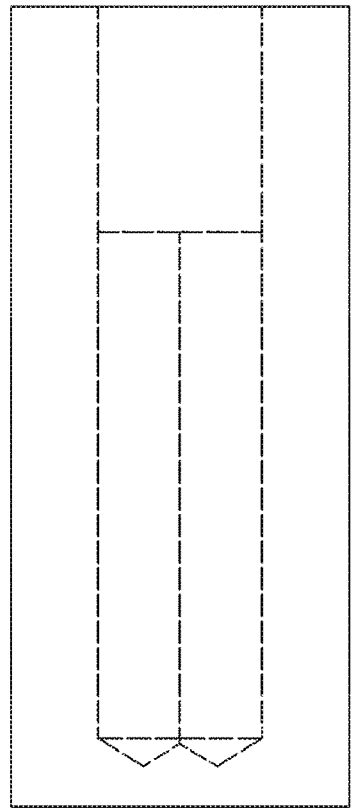
Figure 13A:
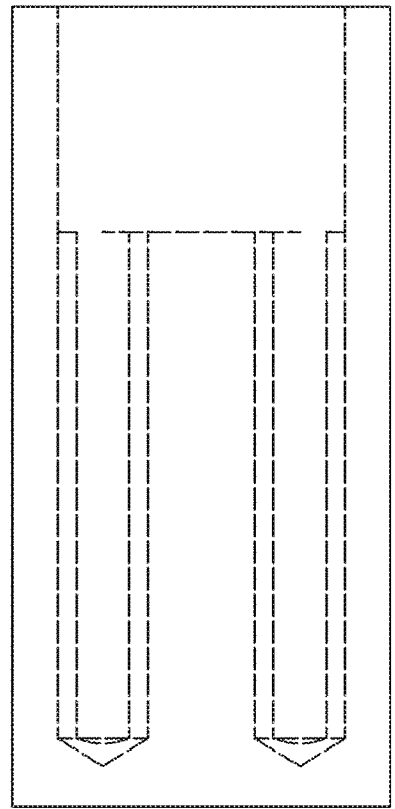
Figure 14C:
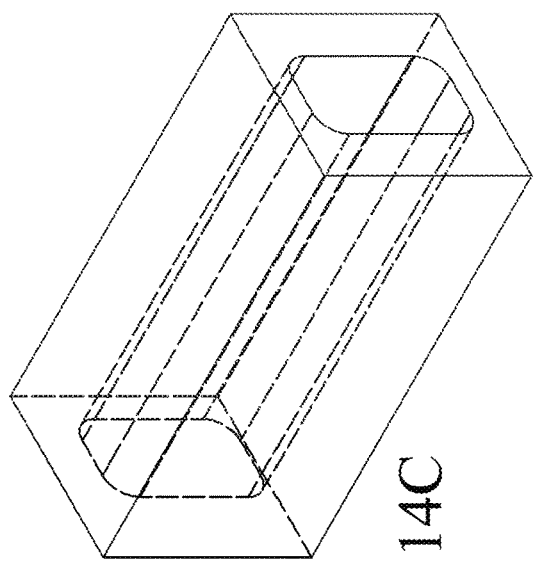
Figure 14D:
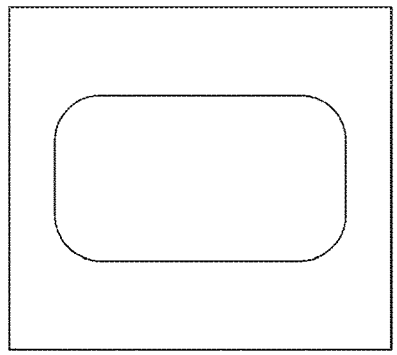
Figure 14B:
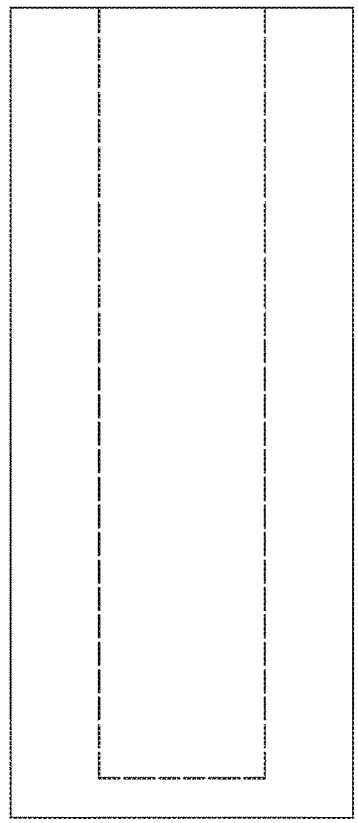
Figure 14A:
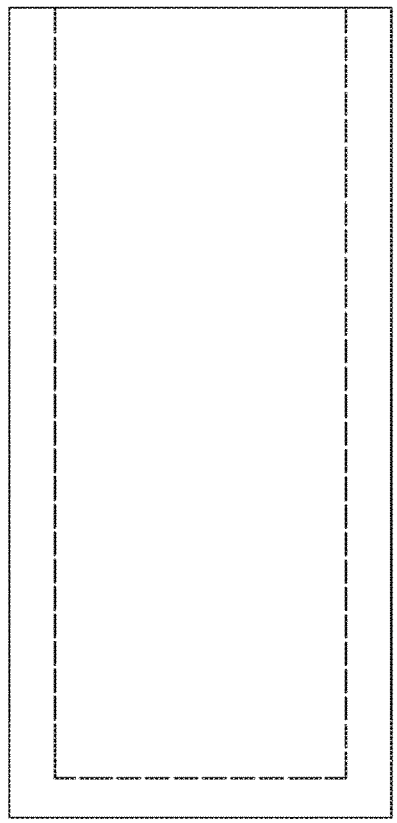
Figure 15C:
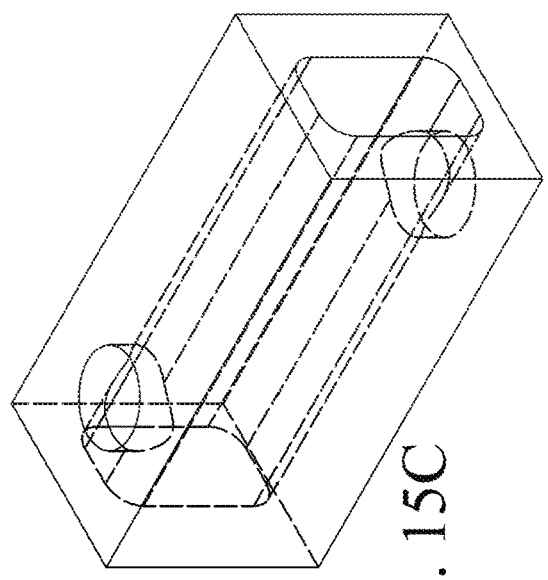
Figure 15D:
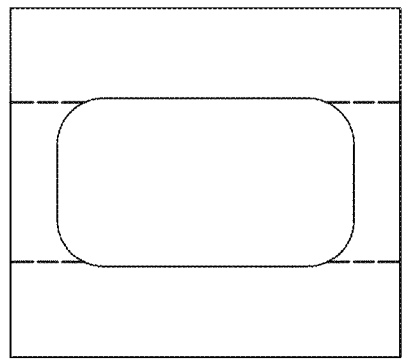
Figure 15B:
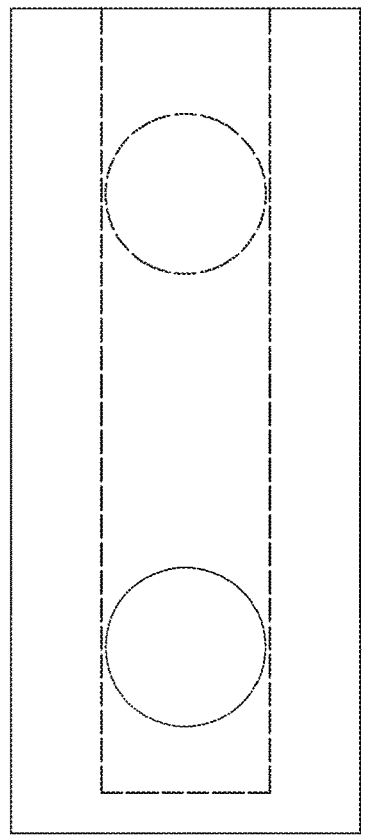
Figure 15A:
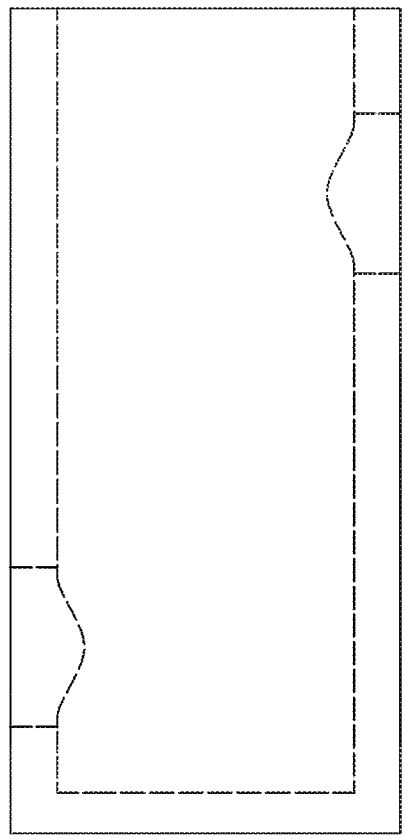
Figure 16C:
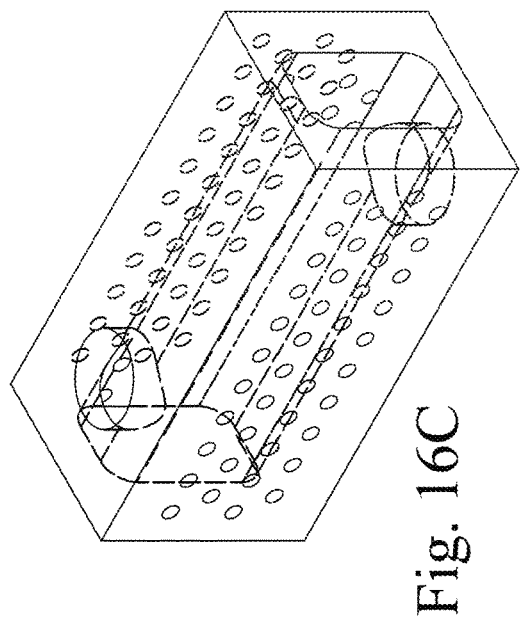
Figure 16D:
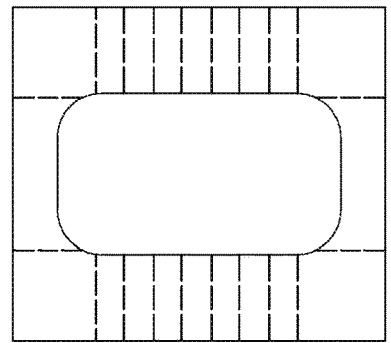
Figure 16B:
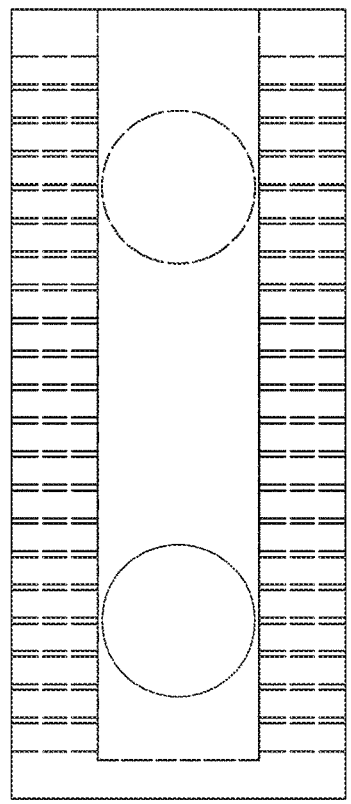
Figure 16A:
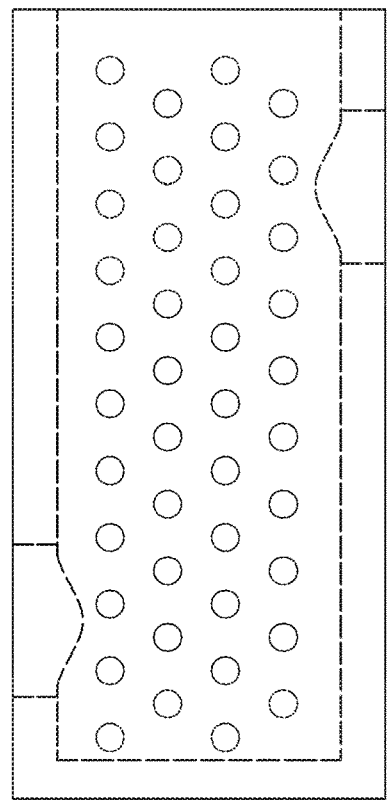
Figure 17C:
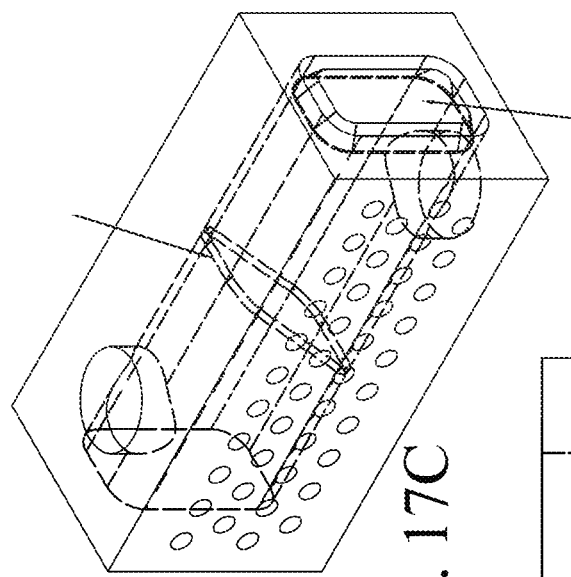
Figure 17D:
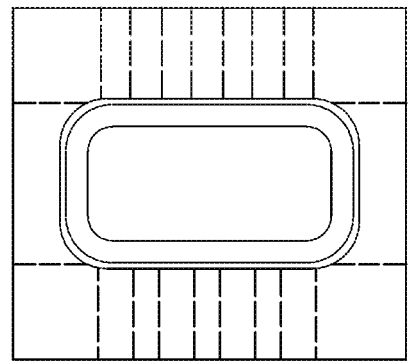
Figure 17B:
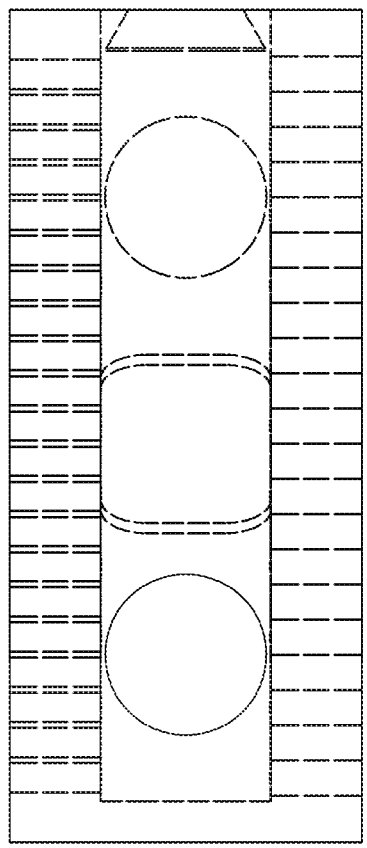
Figure 17A:
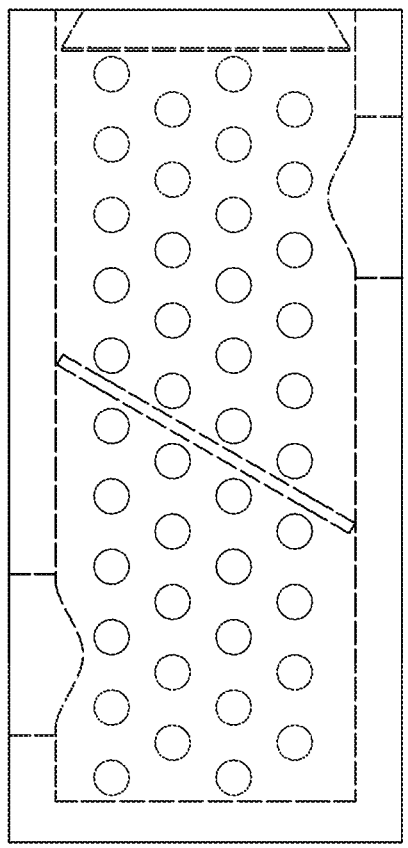
Figure 18:
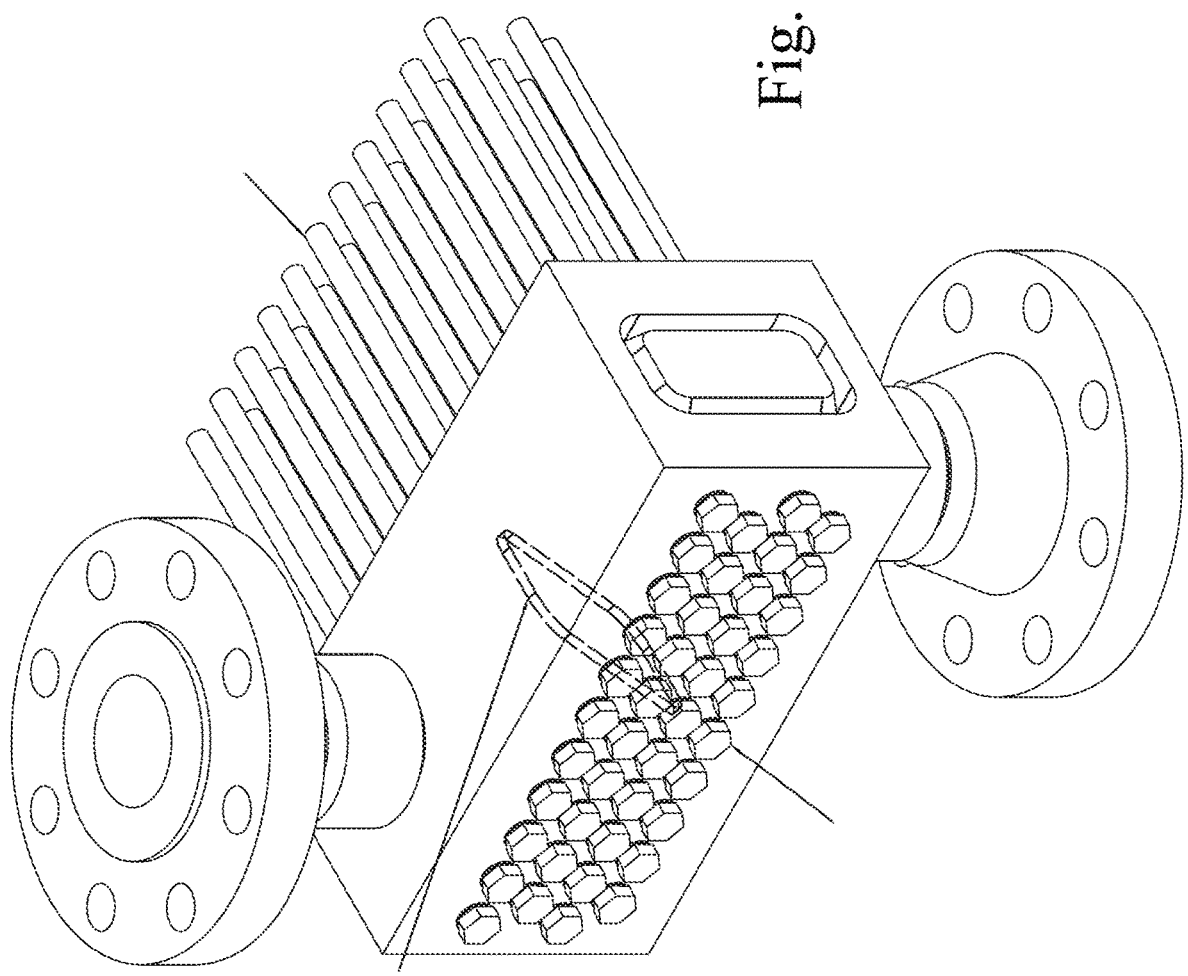
Figure 20C:
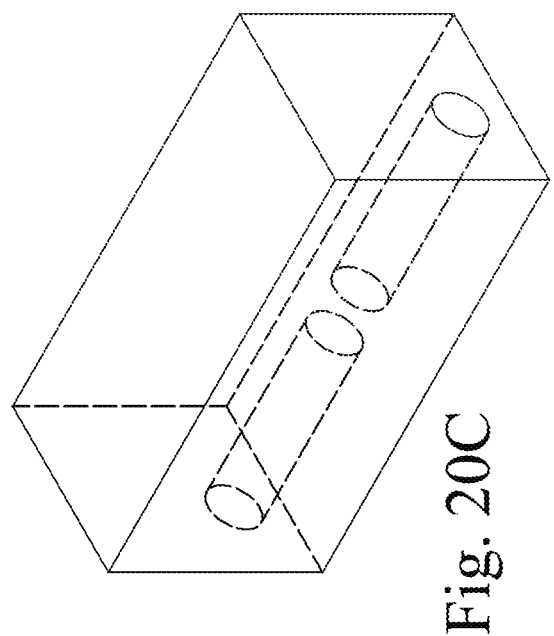
Figure 20D:
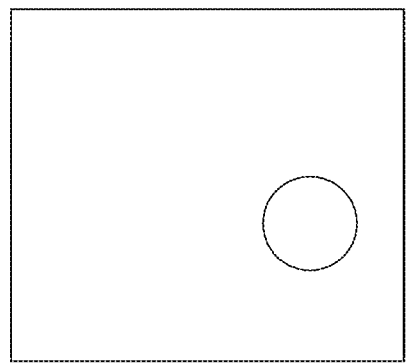
Figure 20B:
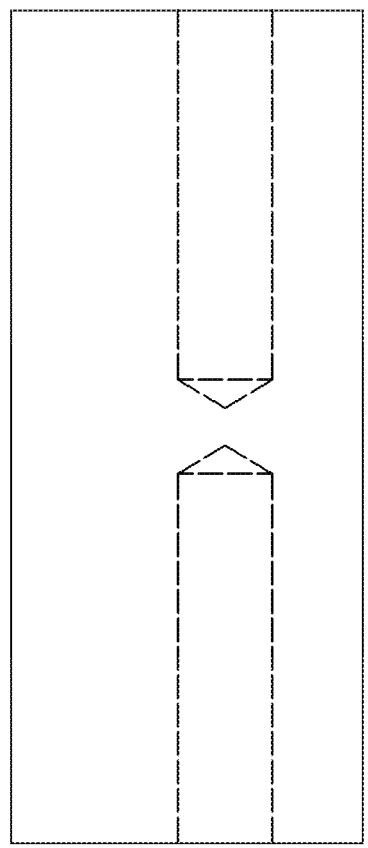
Figure 20A:
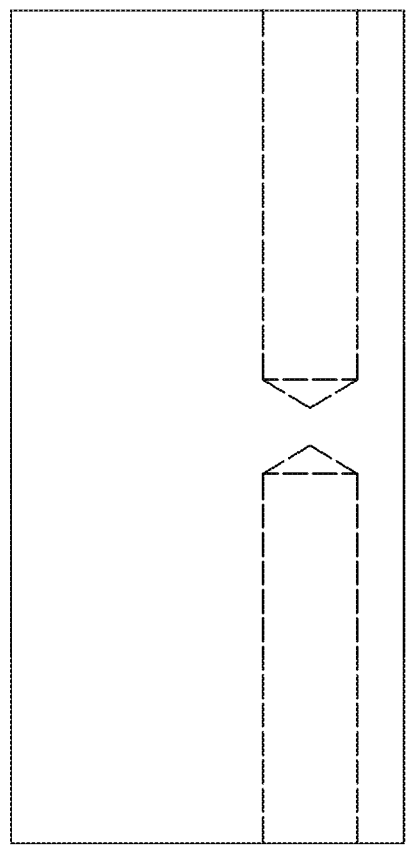
Figure 21C:
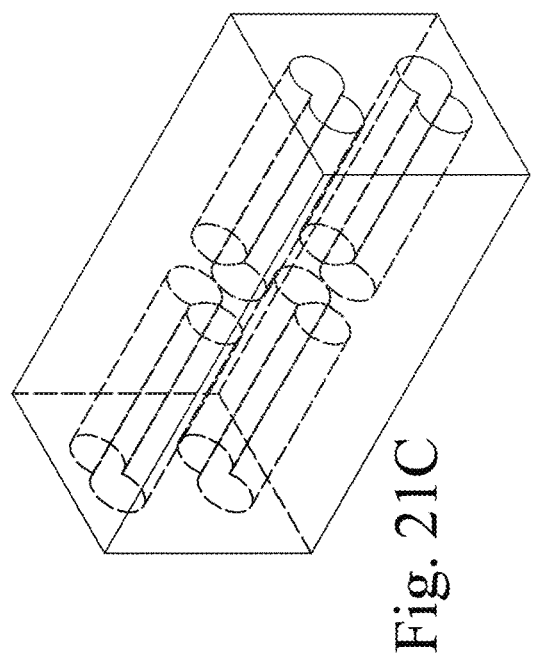
Figure 21D:
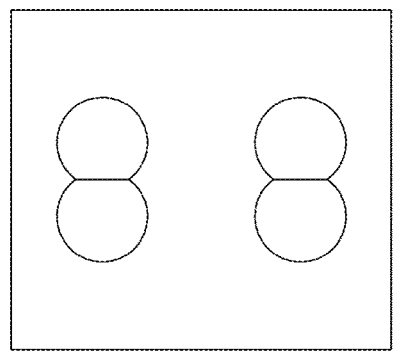
Figure 21B:
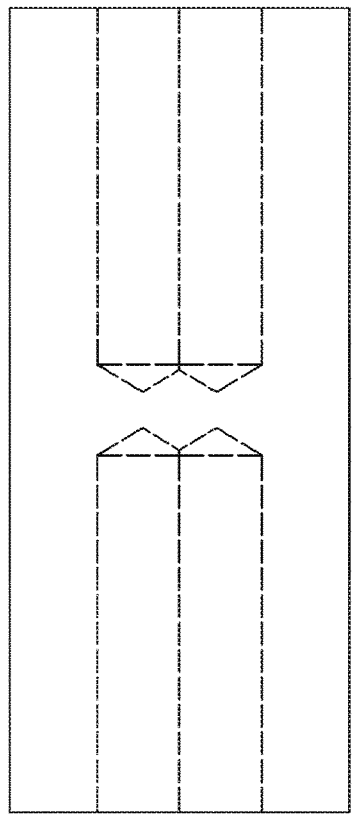
Figure 21A:
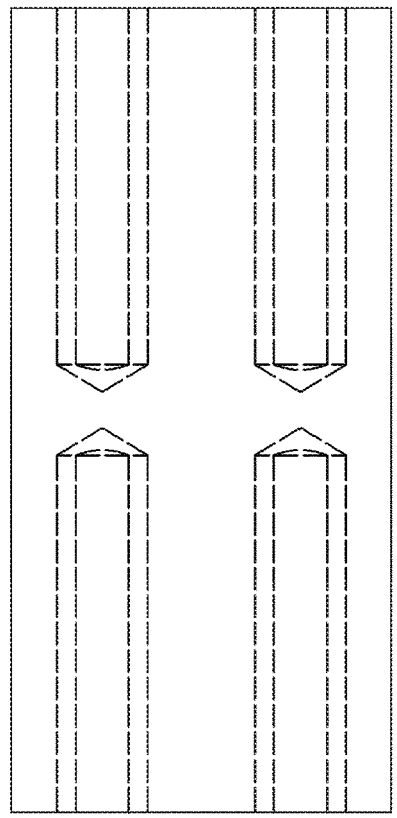
Figure 22C:
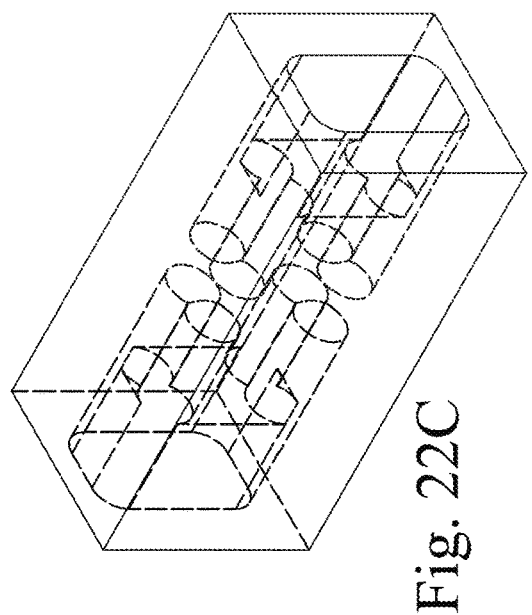
Figure 22D:
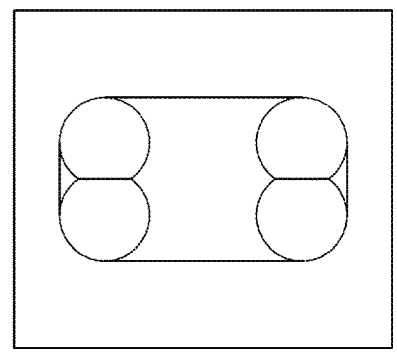
Figure 22B:
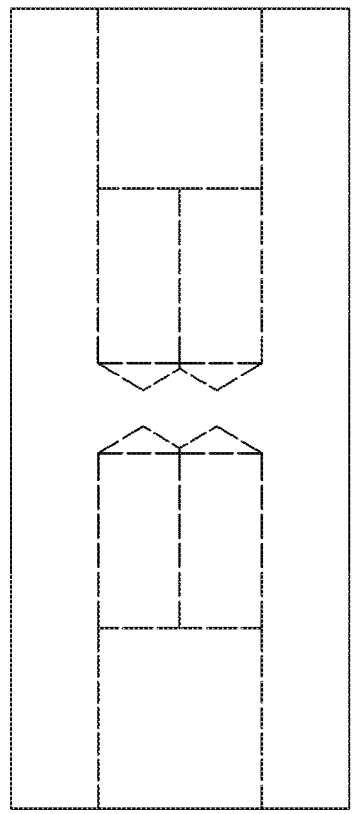
Figure 22A:
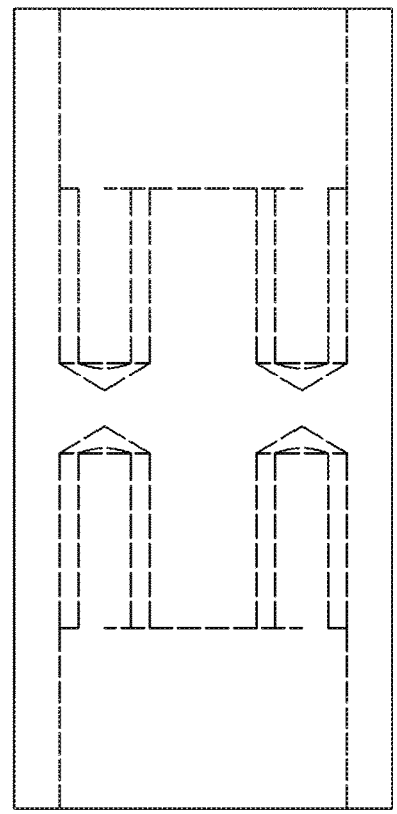
Figure 23C:
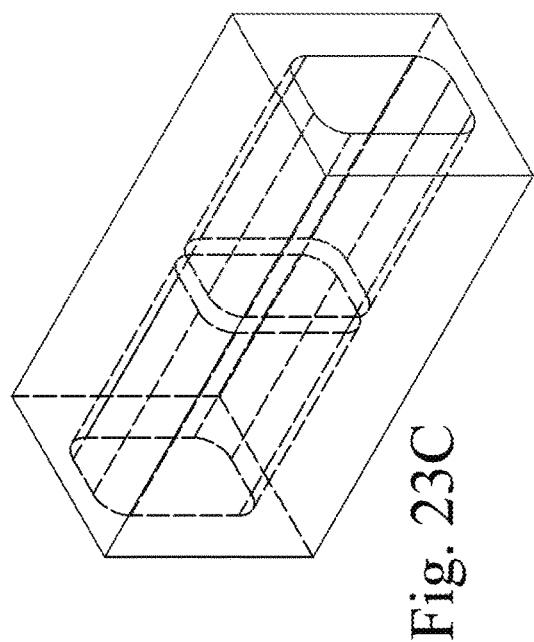
Figure 23D:
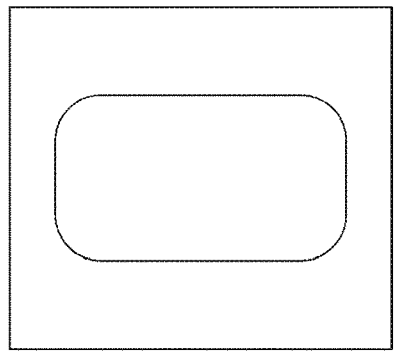
Figure 23B:
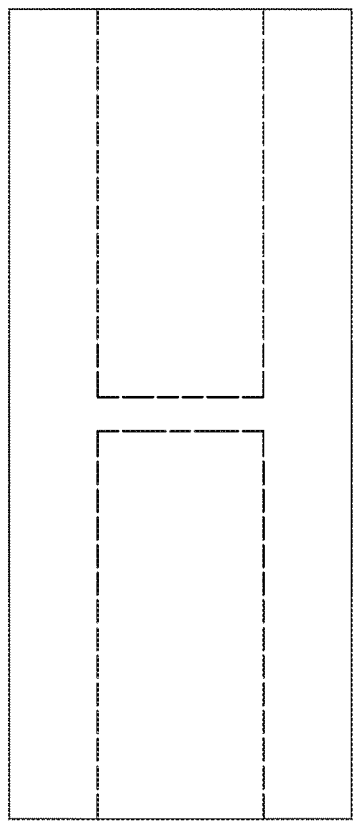
Figure 23A:
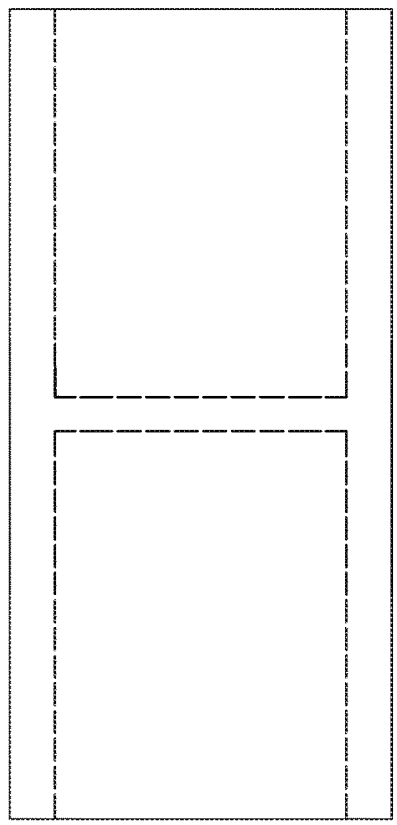
Figure 24C:
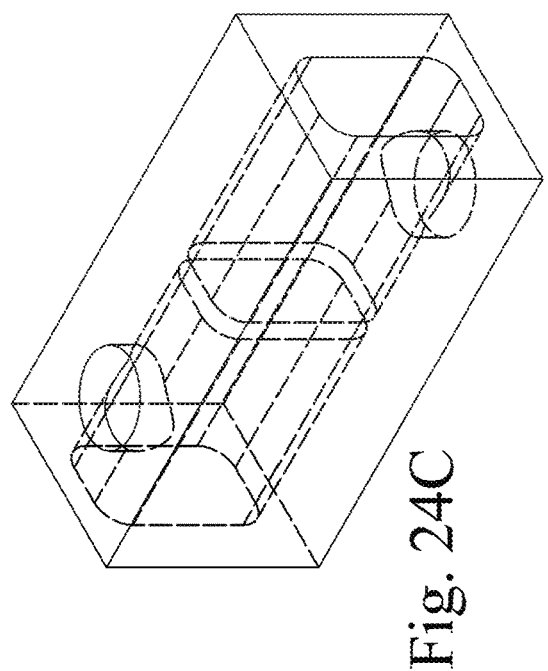
Figure 24D:
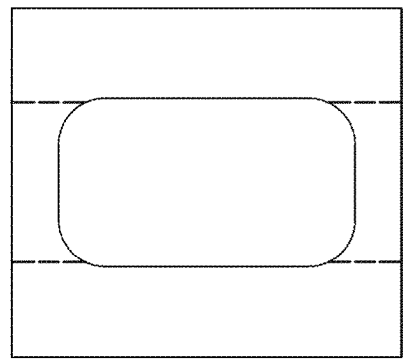
Figure 24B:
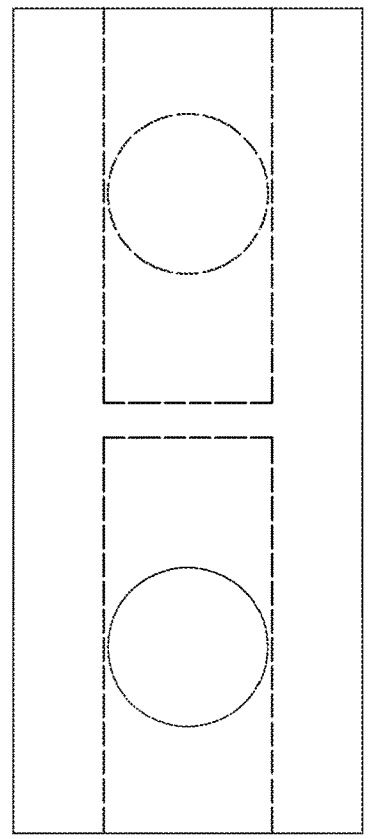
Figure 24A:
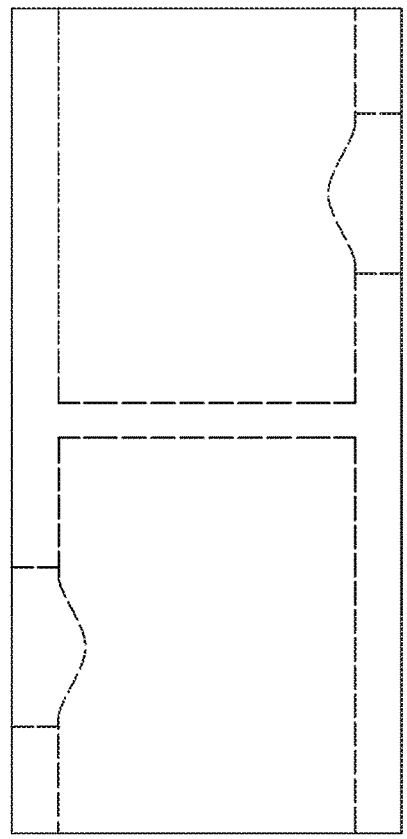
Figure 25C:
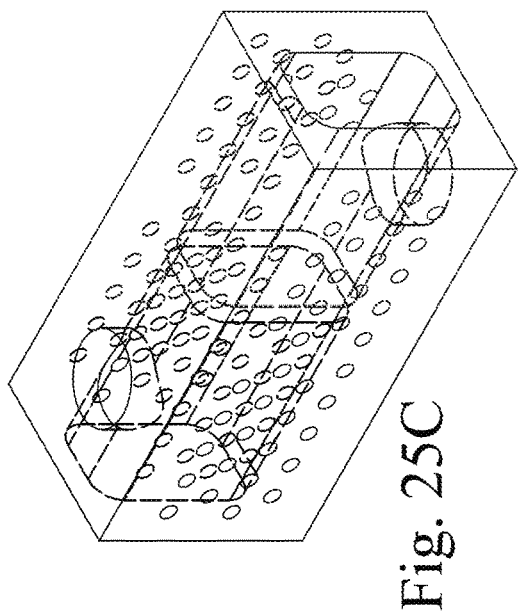
Figure 25D:
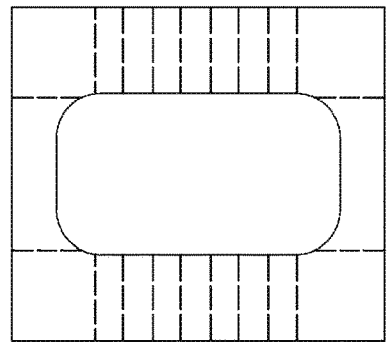
Figure 25B:
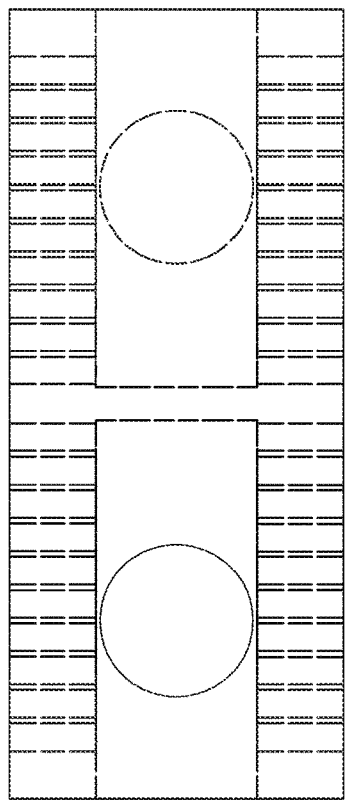
Figure 25A:
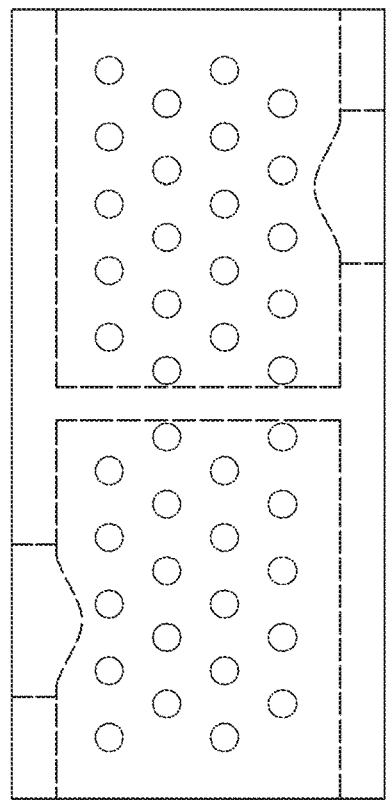
Figure 26C:
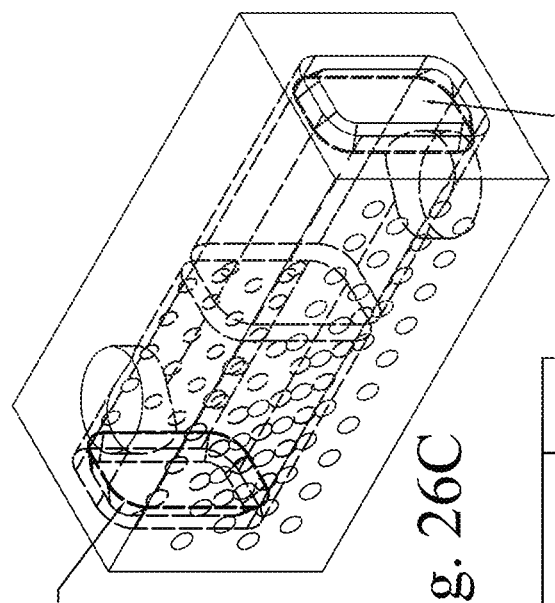
Figure 26D:
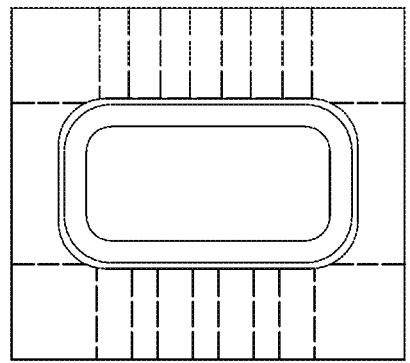
Figure 26B:
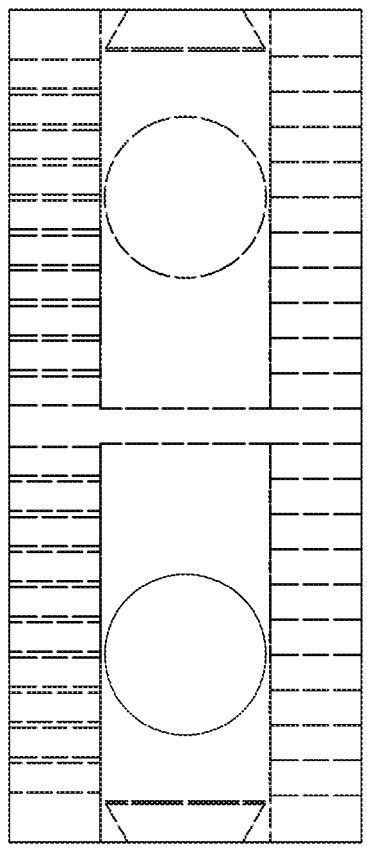
Figure 26A:
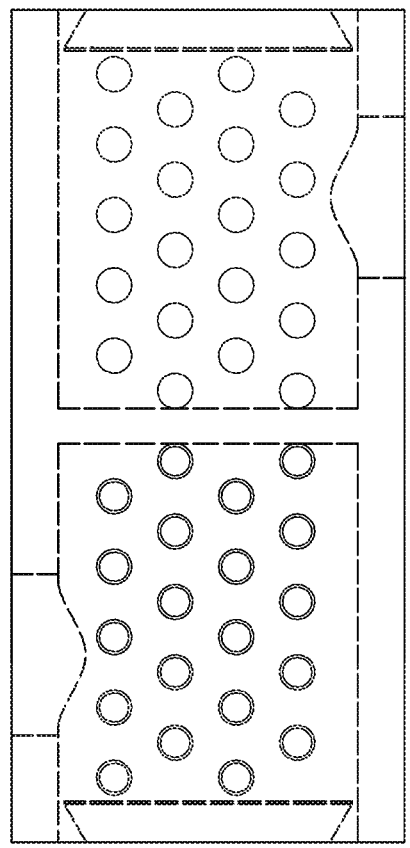
Figure 27:
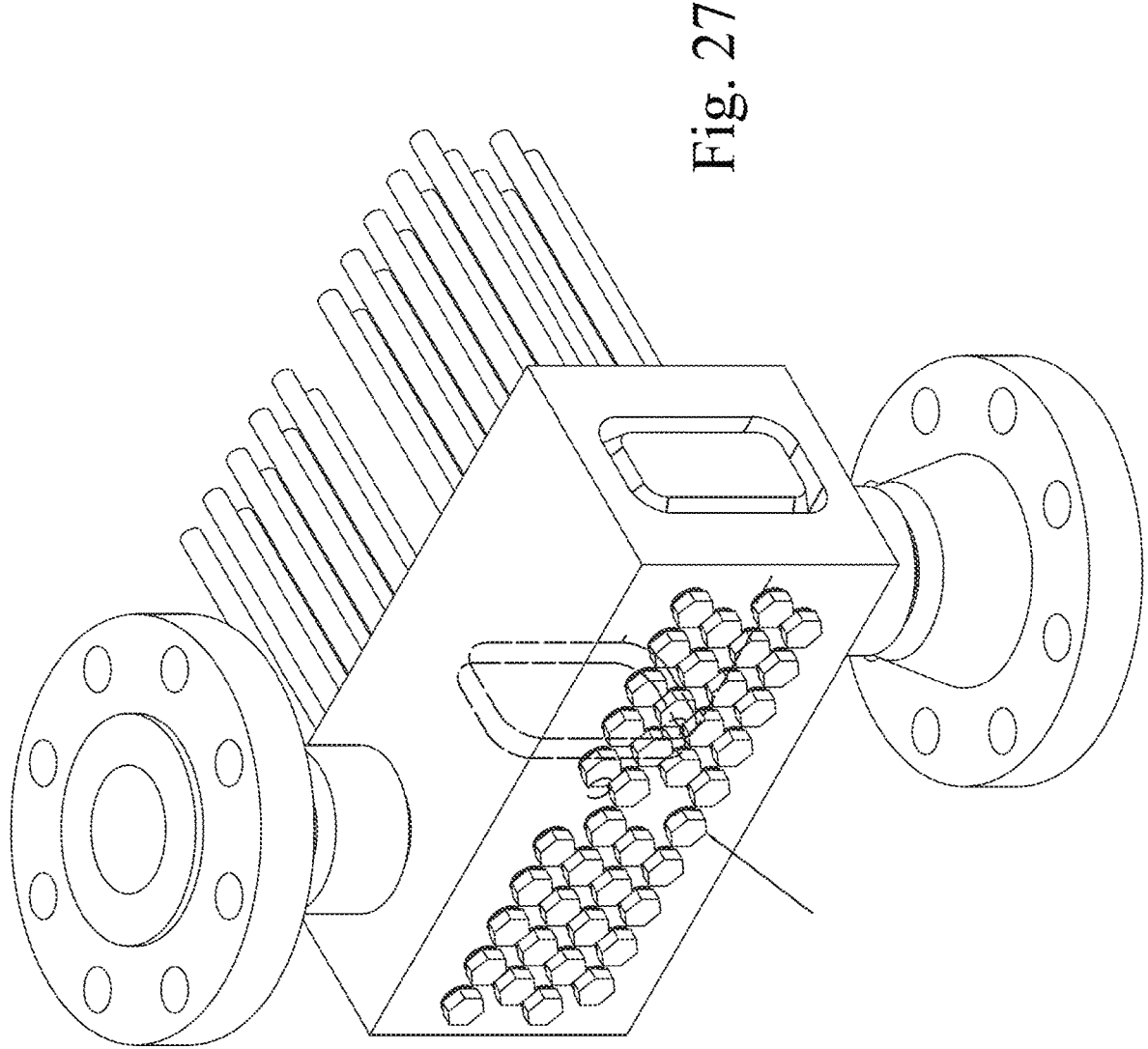
Figure 28:
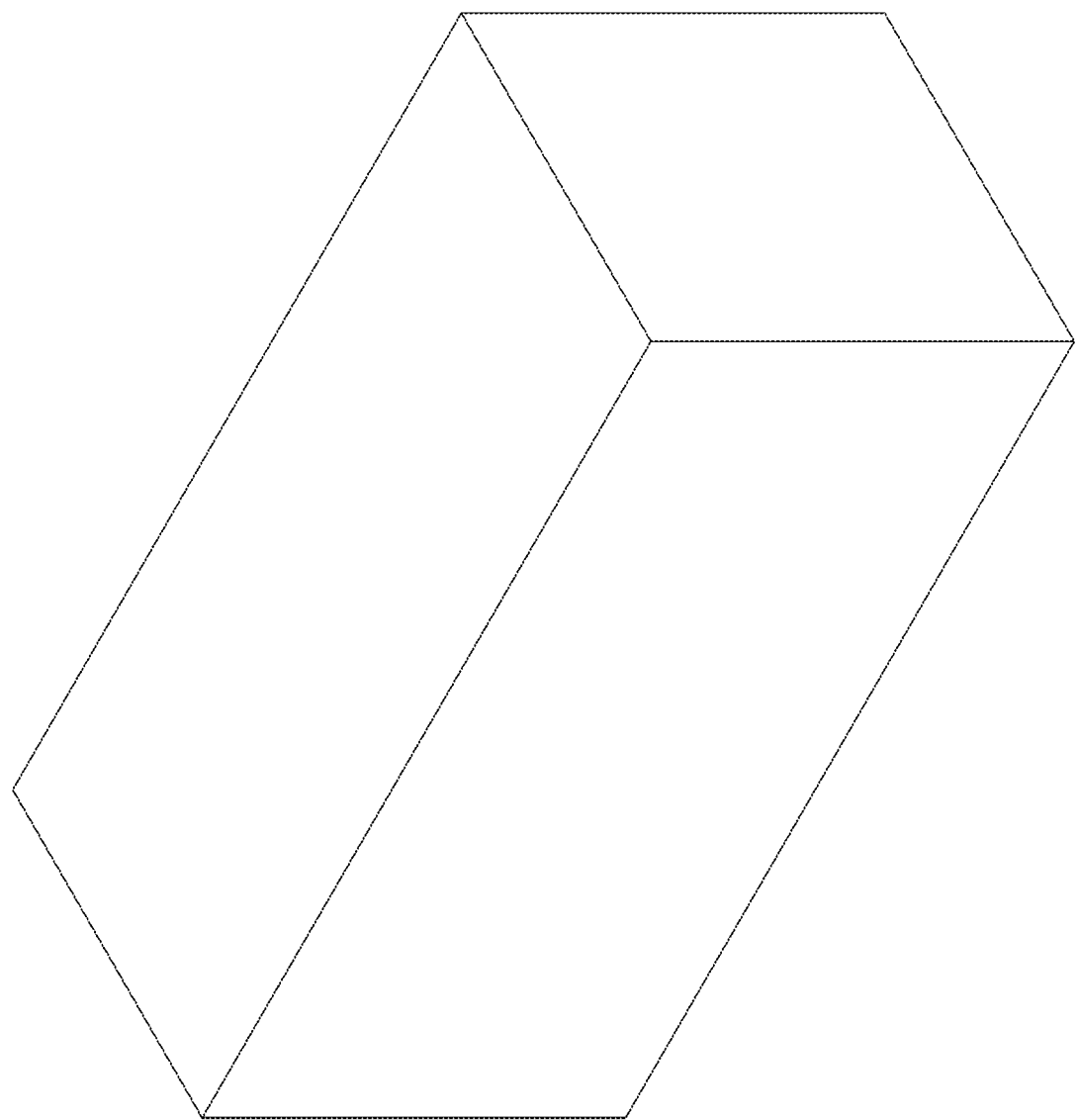
Figure 29C:
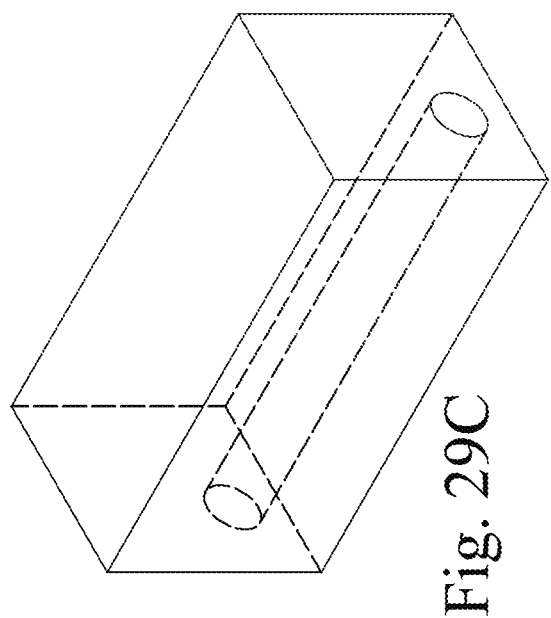
Figure 29D:
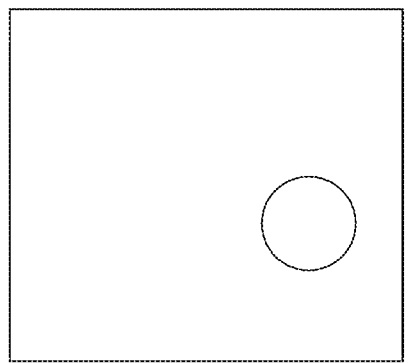
Figure 29B:
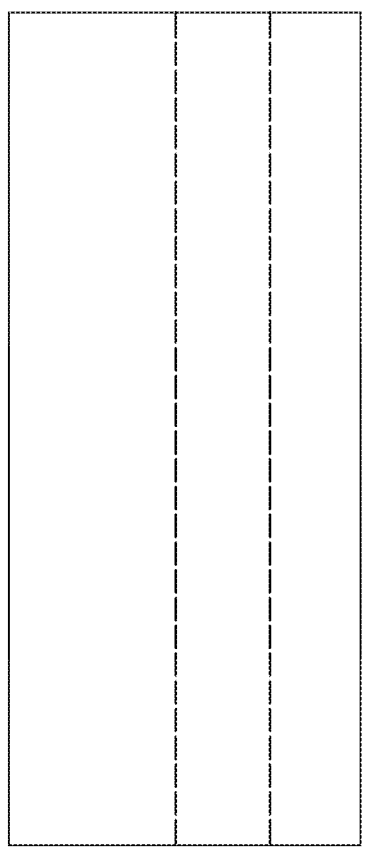
Figure 29A:
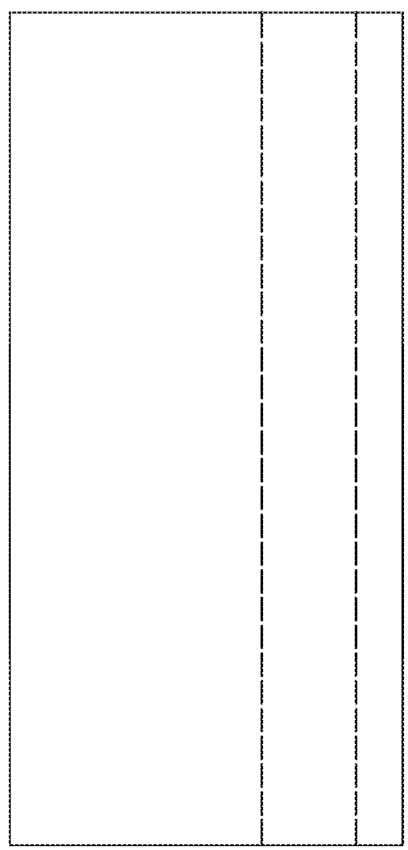
Figure 30C:
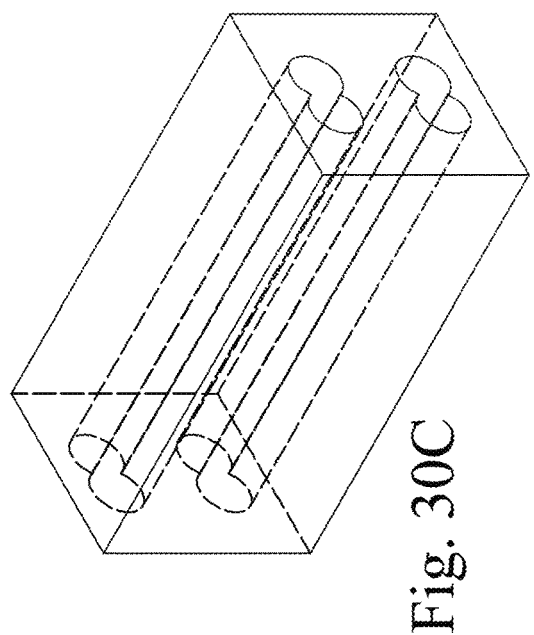
Figure 30D:
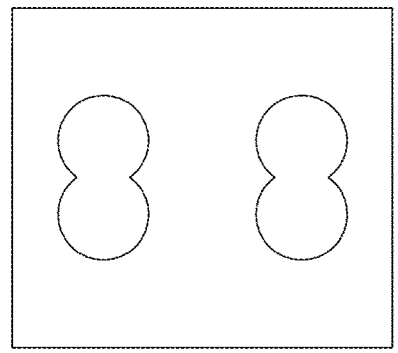
Figure 30B:
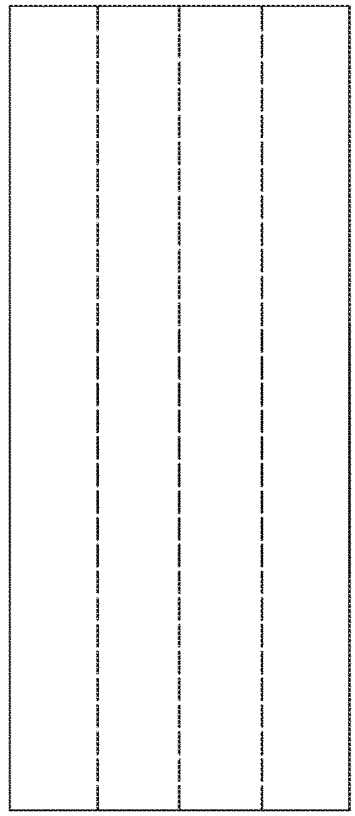
Figure 30A:
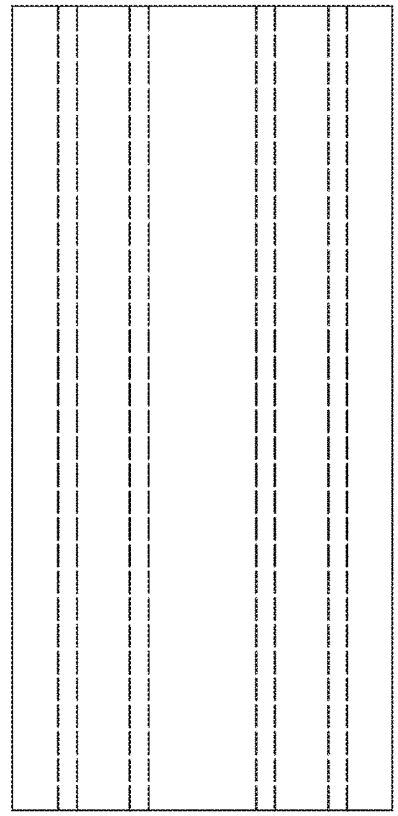
Figure 31C:
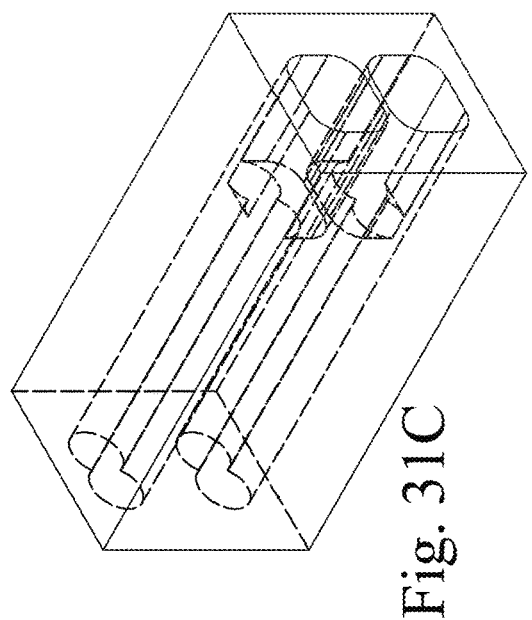
Figure 31D:
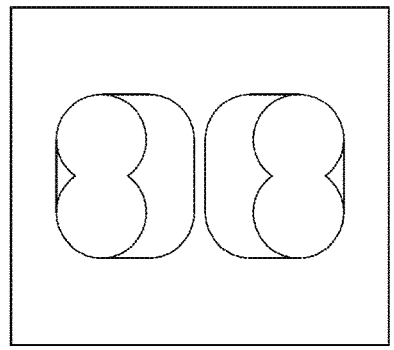
Figure 31B:
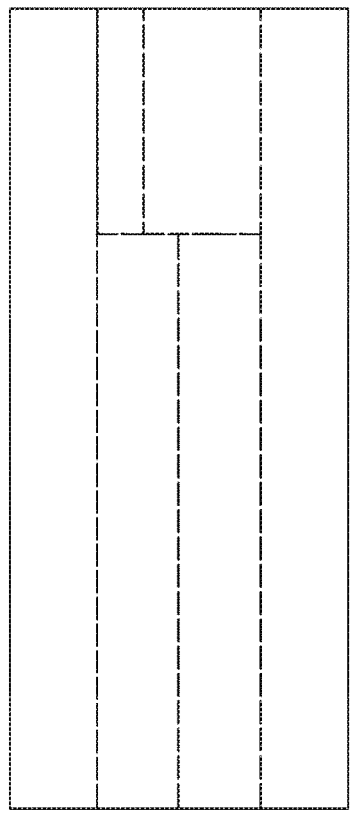
Figure 31A:
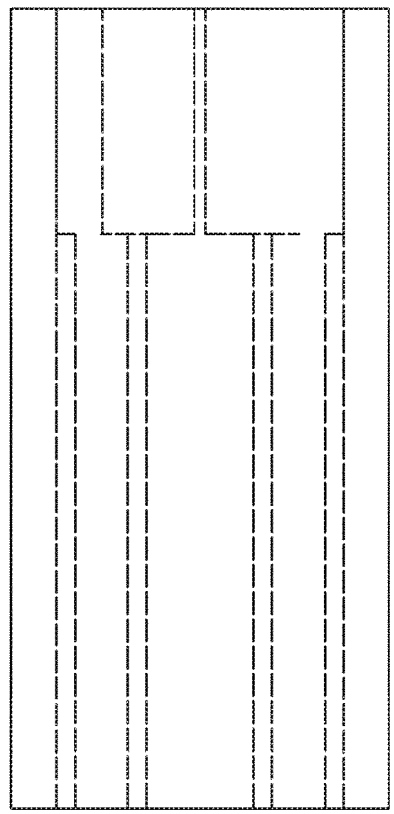
Figure 32C:
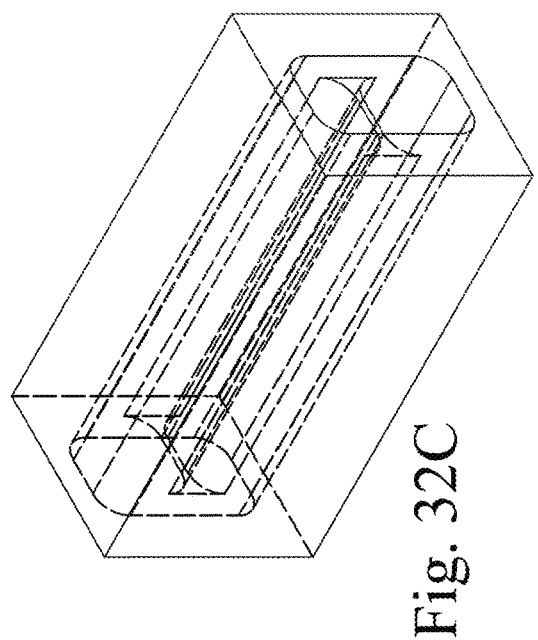
Figure 32D:
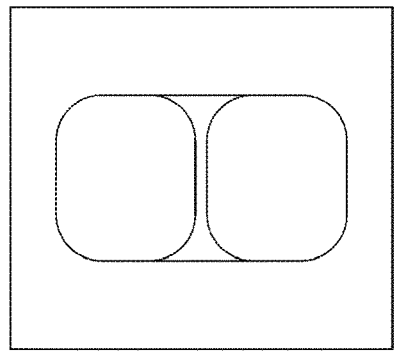
Figure 32B:
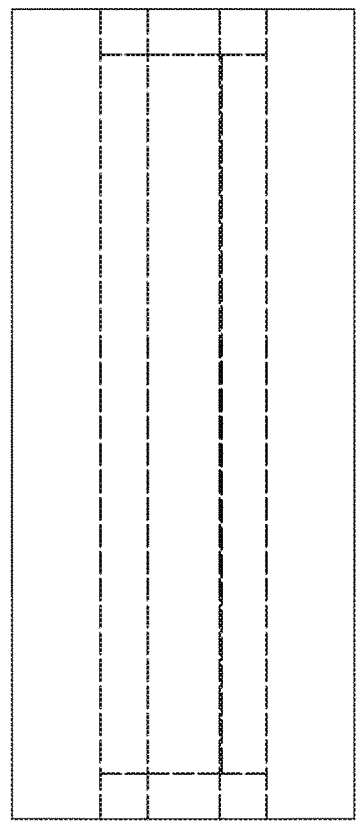
Figure 32A:
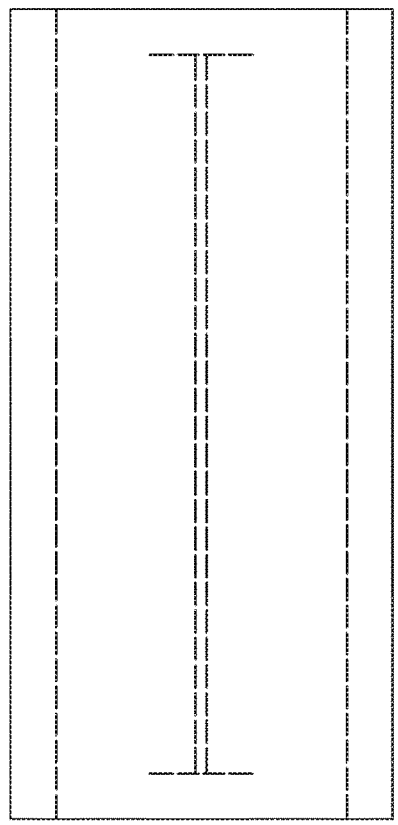
Figure 33C:
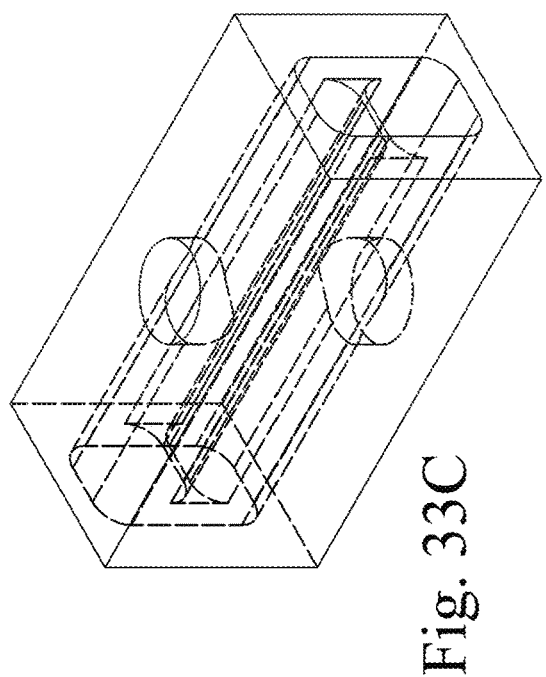
Figure 33D:
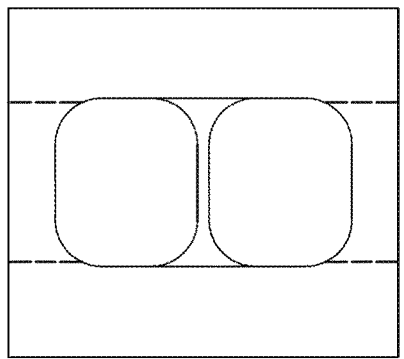
Figure 33B:
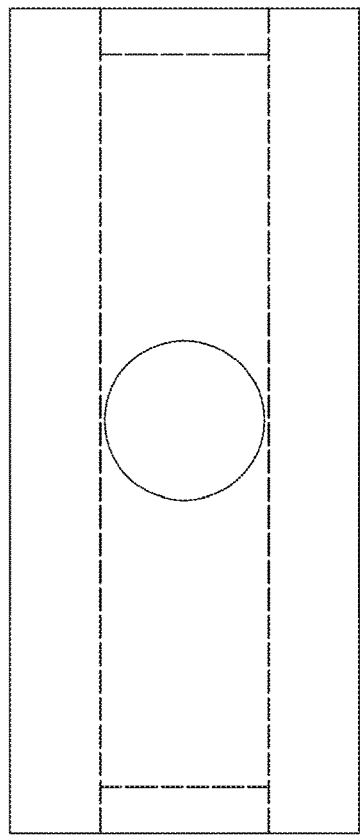
Figure 33A:
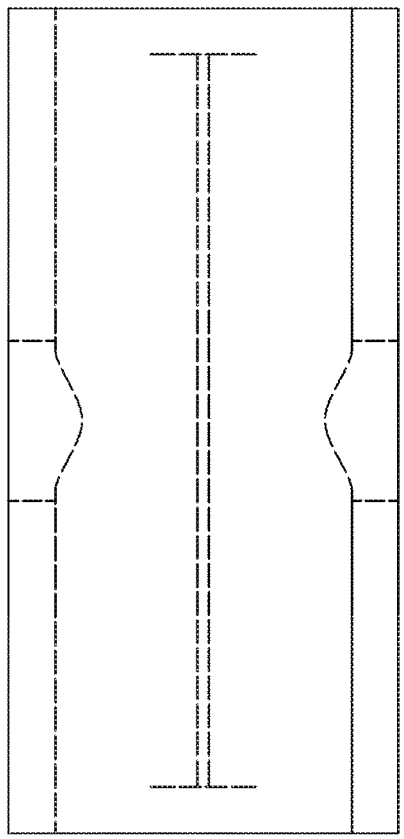
Figure 35C:
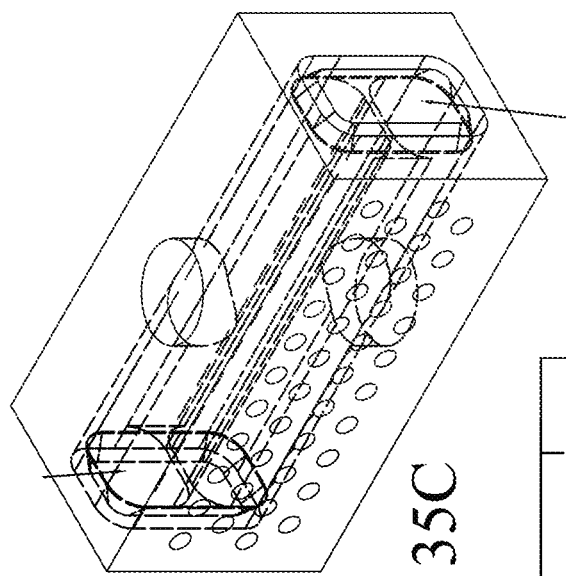
Figure 35D:
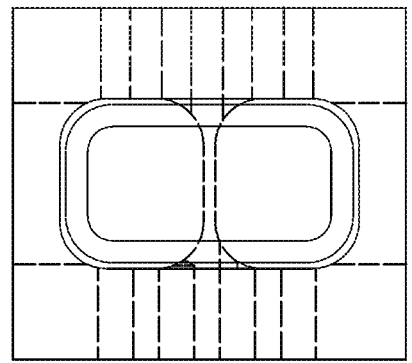
Figure 35B:
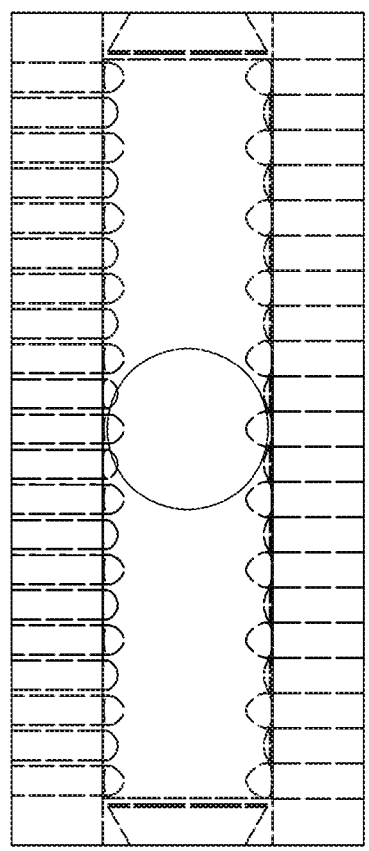
Figure 35A:
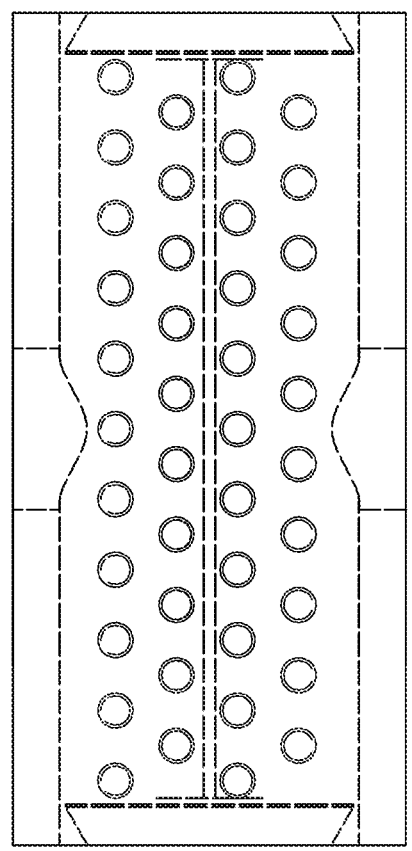
Figure 36:
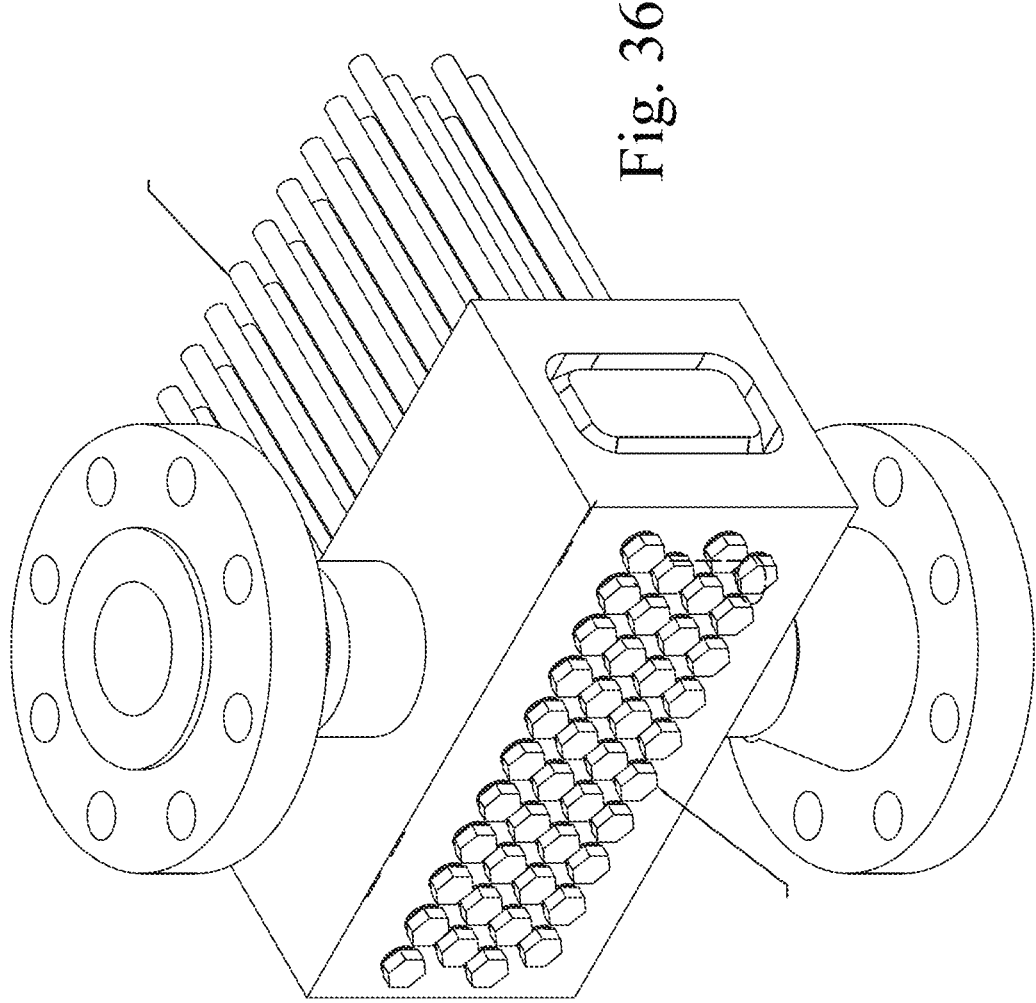

FIG. 2A is a side view, FIG. 2B is a top view, FIG. 2C is a perspective view, and FIG. 2D is an end view of the first step in the method of manufacturing a box header. At least one hole 28 is bored into and from at least one end 14 of the slab 12. The hole 28 is bored parallel to the side walls 18, 20, 22 and 24. The side 18 may be designated the tube sheet, in which case the opposed side 20 may be designated the access plug sheet. The opposed sides 22 and 24 are designated the wrapper plates. The hole 28 may be bored through the opposed end 16. Alternatively, the hole 28 may alternately be bored up to and near, but not through, the end 16 so that the closed end 16 remains solid.

FIGS. 3A, 3B, 3C and 3D illustrate the next step in the sequential process or method. FIG. 3A is a side view, FIG. 3B is a top view, FIG. 3C is a perspective view, and FIG. 4D is an end view. A plurality of additional holes 30, 32 and 34 are bored into at least one end of the elongated slab 12. The additional long holes 30, 32, and 34 are parallel to the original hole 28 shown in FIG. 1. In a preferred embodiment as shown, the four parallel holes 28, 30, 32 and 34 are located in the corners of an elongated chamber to be formed within the slab 12 having a rectangular or square cross-section. The holes 28, 30, 32 and 34 may be bored entirely through the slab 12 as shown in the drawings or, alternatively, may be drilled up to and near opposed ends 16, but not therethrough, so that a closed end 16 is retained.

FIG. 4A shows a side view, FIG. 4B shows a top view, FIG. 4C shows a perspective view and FIG. 4D shows an end view of the next step in the sequential process or method to manufacture a box header. Adjacent and between the holes 28, 30, 32 and 34, material in the slab 12 is milled out and removed in order to form an elongated internal chamber 40 in the slab 12 having at least one open end. In the embodiment shown, material is milled out from one end 14 showing the chamber partially formed. Material might be milled out from either or both ends if the holes are drilled from both ends.

FIG. 5A illustrates a side view, FIG. 5B illustrates a top view, FIG. 5C illustrates a perspective view and FIG. 5D illustrates an end view of the next step in the sequential process. Material has been completely milled out from the slab 12 adjacent the holes 28, 30, 32 and 34 in order to form an elongated open internal chamber 40 into the slab. In the embodiment shown, the elongated chamber 40 extends from one end 14 through to the opposed end 16. Alternatively, the material may be milled out only close to, but not through, the opposed end 16. The elongated internal chamber 40 has a square or rectangular cross-section and may be substantially in the form of a quadrilateral.

FIG. 6A illustrates a side view, FIG. 6B illustrates a top view, FIG. 6C illustrates a perspective view and FIG. 6D illustrates an end view of the next sequential steps in the process or method of manufacturing a box header.

In addition, at least one inlet nozzle opening hole 50 is machined from one side 22 of the slab 12 into the elongated chamber 40.

At least one outlet nozzle hole opening 52 is machined into the slab 12 from an opposed side 24 into the elongated internal chamber 40.

FIG. 7A illustrates a side view, FIG. 7B illustrates a top view, FIG. 7C illustrates a perspective view and FIG. 7D illustrates an end view of the next sequential steps in the process or method to manufacture a box header. A plurality of tube holes 60 are drilled into the slab 12 from one side into the elongated internal chamber 40. The tube holes 60 are normally arranged in rows as shown. A plurality of access plug holes 64 are drilled and tapped into the slab 12 from an opposed side into the elongated open internal chamber 40.

FIG. 8A illustrates a side view, FIG. 8B illustrates a top view, FIG. 8C illustrates a perspective view and FIG. 8D illustrates an end view of the next sequential steps in the method or process of manufacturing a box header. In some cases, an optional pass plate 70 may be inserted into the elongated internal chamber 40. The pass plate may be positioned at an angle to the axis of the elongated internal chamber 40. The pass plate 70 will be welded in place inside of the elongated open internal chamber 40. The pass plate serves to divide the internal chamber 40 into two chambers.

Thereafter, a metal plate or end block 74 will be welded to the opening in the end 14. If the elongated internal chamber passes through the opposite end 16, then a second end plate or end block 74 will be welded to the open end in opposed end 16. This results in a closed end internal chamber.

FIG. 9 illustrates the remaining steps of the method or process to manufacture a box header, along with the completed box header.

A plurality of tubes 78 are inserted and installed into the plurality of tube holes 60. Likewise, a plurality of access plugs 80 are threaded into the access plug holes 64 opposite each of the tube holes.

In addition, at least one flanged inlet nozzle pipe connection 84 is welded into the inlet nozzle opening 50. Likewise, at least one outlet flanged nozzle pipe 86 is welded into the outlet nozzle opening 52. It will be understood that there may be more than one inlet and outlet connection on the box header.

FIGS. 10 through 18 illustrate an alternative sequential method or process of manufacturing or fabricating a box header utilizing drilling and milling from one end only wherein the opposed end forms a closed wall.

FIGS. 19 through 27 illustrate a further alternative sequential method or process of manufacturing or fabricating a box header including drilling and milling from opposed ends with a center portion left in place in lieu of or instead of a pass plate in order to form two internal chambers.

FIGS. 28 through 36 illustrate a further alternate sequential method or process of manufacturing or fabricating a box header wherein drilling or milling takes place from one end through the opposed end and wherein an elongated or horizontal portion is left in place so that the header is adapted for counterflow operation.

The method or process of the present invention greatly reduces the amount of welds in the completed box header and reduces the total cycle time and expense in fabrication, including the otherwise associated welding inspection time and cost.

Whereas, the invention has been described in relation to the drawings attached hereto, it should be understood that other and further modifications, apart from those shown or suggested herein, may be made within the scope of this invention.

What is claimed is:

1. A method of manufacturing a box header for an air-cooled heat exchanger, which method comprises the steps of:

boring a plurality of holes into at least one end of an elongated solid slab of metal;

milling out material from inside said solid slab adjacent to said plurality of holes to form an elongated internal open chamber in said slab having at least one open end, wherein said plurality of holes form corners of said elongated internal open chamber;

machining at least one inlet nozzle opening into said elongated internal chamber and machining at least one outlet nozzle opening into said elongated internal chamber;

drilling and tapping a plurality of tube holes and a plurality of access plug holes in said slab into said elongated internal open chamber; and welding an end block to said at least one open end in order to form a closed internal chamber.

2. A method of manufacturing a box header as set forth in claim 1 wherein said step of boring a plurality of holes includes boring four parallel holes, each forming corners of said elongated internal chamber having a rectangular cross-section.

3. A method of manufacturing a box header as set forth in claim 1 wherein said steps of boring and milling include boring at least one hole through opposed ends of said elongated slab and milling out material to form said elongated internal chamber having a pair of opposed open ends and wherein said step of welding said end block includes welding a pair of end blocks on said opposed open ends in order to form said closed internal chamber.

4. A method of manufacturing a box header as set forth in claim 1 including the additional step of inserting and welding a pass plate in said elongated internal chamber prior to welding said end block to said at least one open end.

5. A method of manufacturing a box header as set forth in claim 1 including the additional step of inserting a plurality of tubes into said plurality of tube holes.

6. A method of manufacturing a box header as set forth in claim 1 including the additional step of connecting a plurality of threaded access plugs into said plug holes.

7. A method of manufacturing a box header as set forth in claim 1 including the additional step of welding at least one inlet nozzle to said at least one inlet nozzle opening.

8. A method of manufacturing a box header as set forth in claim 1 including the additional step of welding at least one outlet nozzle to said at least one outlet nozzle opening.

9. A method of manufacturing a box header as set forth in claim 1 wherein said elongated slab of metal is carbon steel.

* * * * *